United States Patent [19]
Caldwell

[11] Patent Number: 4,809,592
[45] Date of Patent: Mar. 7, 1989

[54] VENTILATING CONSTRUCTION AND METHOD OF MAKING THE SAME

[75] Inventor: Edward N. Caldwell, Knoxville, Tenn.

[73] Assignee: Dalen Products, Inc., Knoxville, Tenn.

[21] Appl. No.: 103,602

[22] Filed: Oct. 1, 1987

Related U.S. Application Data

[63] Continuation-in-part of Ser. No. 84,695, Aug. 11, 1987, abandoned.

[51] Int. Cl.⁴ .................................................. F24F 7/00
[52] U.S. Cl. ............................................ 98/32; 47/17; 47/19; 47/28 R; 47/29; 98/37; 98/42.2
[58] Field of Search .......................... 47/17, 19, 28, 29; 98/32, 37, 42.01, 42.16, 42.2; 135/93, 94; 160/116, 180, 354

[56] References Cited

U.S. PATENT DOCUMENTS

| | | | |
|---|---|---|---|
| 1,392,178 | 9/1921 | Kuebler | 47/29 |
| 2,728,115 | 12/1955 | Corhelivs | 47/28 |
| 3,028,872 | 4/1962 | Cresswell | 98/42.16 X |

FOREIGN PATENT DOCUMENTS

| | | | |
|---|---|---|---|
| 1270399 | 7/1961 | France | 47/19 |
| 640703 | 1/1979 | U.S.S.R. | 47/19 |
| 1575193 | 9/1980 | United Kingdom | 47/29 |
| 2133109 | 7/1984 | United Kingdom | 47/19 |

*Primary Examiner*—Harold Joyce
*Attorney, Agent, or Firm*—Candor, Candor & Tassone

[57] ABSTRACT

A ventilating construction, such as for a cold frame or for other desired structures, and method of making the same are provided, the ventilating construction comprising a sheet of material having an opening therethrough a flap hinged to the sheet for opening and closing the opening. The sheet comprises two like walls of polymeric material disposed in spaced apart substantially parallel relation with a plurality of spaced apart substantially parallel ribs of polymeric material disposed between the walls and interconnected thereto. The flap comprises a section of the sheet cut therefrom to define the opening and having at least part of one edge thereof being uncut so as to be integral and one-piece with one of the walls to provide a natural hinge therewith.

23 Claims, 10 Drawing Sheets

VENTILATING CONSTRUCTION AND METHOD OF MAKING THE SAME

CROSS-REFERENCE TO RELATED APPLICATION

This application is a continuation-in-part patent application of its copending parent patent application, Ser. No. 084,695, filed Aug. 11, 1987, now abandoned in favor of this continuation-in-part patent application.

BACKGROUND OF THE INVENTION

1. Field of the Invention

This invention relates to a new ventilating construction, such as for a cold frame, for a crawl space for a building, etc., and to a new method of making such a ventilating construction.

2. Prior Art Statement

It is known to provide a ventilating construction comprising a sheet of material having an opening means therethrough and a flap means hinged to the sheet for opening and closing the opening means.

SUMMARY OF THE INVENTION

It is one feature of this invention to provide a new ventilating construction wherein the material forming the construction can be utilized in a unique manner to provide the hinged flap structure that is controlled by a thermally operated actuator means.

In particular, it was found according to the teachings of this invention that commercially available twin-wall glazing material, such as polycarbonate, can have a ventilating opening cut therethrough in such a unique manner that the cut section of the sheet of material forms a flap means opening and closing the vent opening while remaining integral and one-piece with the sheet of material at at least part of one edge thereof to provide a natural hinge for the flap means.

In this manner, it was found that such a ventilating construction can be utilized in combination with a thermally operated actuator means so that the flap means will be automatically opened and closed in response to the temperature sensed by the actuator means whereby such a construction can be utilized to form a cold frame construction, an automatic foundation vent, etc.

Therefore, one embodiment of this invention provides a ventilating construction comprising a sheet of material having an opening means therethrough and a flap means hinged to the sheet for opening and closing the opening means, the sheet comprising two like walls of polymeric material disposed in spaced apart substantially parallel relation with a plurality of spaced apart substantially parallel ribs of polymeric material disposed between the walls and interconnected thereto, the flap means comprising a section of the sheet cut therefrom to define the opening means and having at least part of one edge thereof being uncut so as to be integral and one-piece with one of the walls to provide a natural hinge therewith.

Accordingly, it is an object of this invention to provide a new ventilating construction having one or more of the novel features of this invention as set forth above or hereinafter shown or described.

Another object of this invention is to provide a new method of making such a ventilating construction, the method of this invention having one or more of the novel features of this invention as set forth above or hereinafter shown or described.

Another object of this invention is to provide a new ventilating cold frame construction having one or more of the novel features of this invention as set forth above or hereinafter shown or described.

Other objects, uses and advantages of this invention are apparent from a reading of this description which proceeds with reference to the accompanying drawings forming a part thereof and wherein:

BRIEF DESCRIPTION OF THE DRAWINGS

FIG. 24 is a view similar to FIG. 20 and illustrates another embodiment of the ventilating construction of this invention for use with a foundation wall of a building or the like.

DESCRIPTION OF THE PREFERRED EMBODIMENTS

Figure 1:
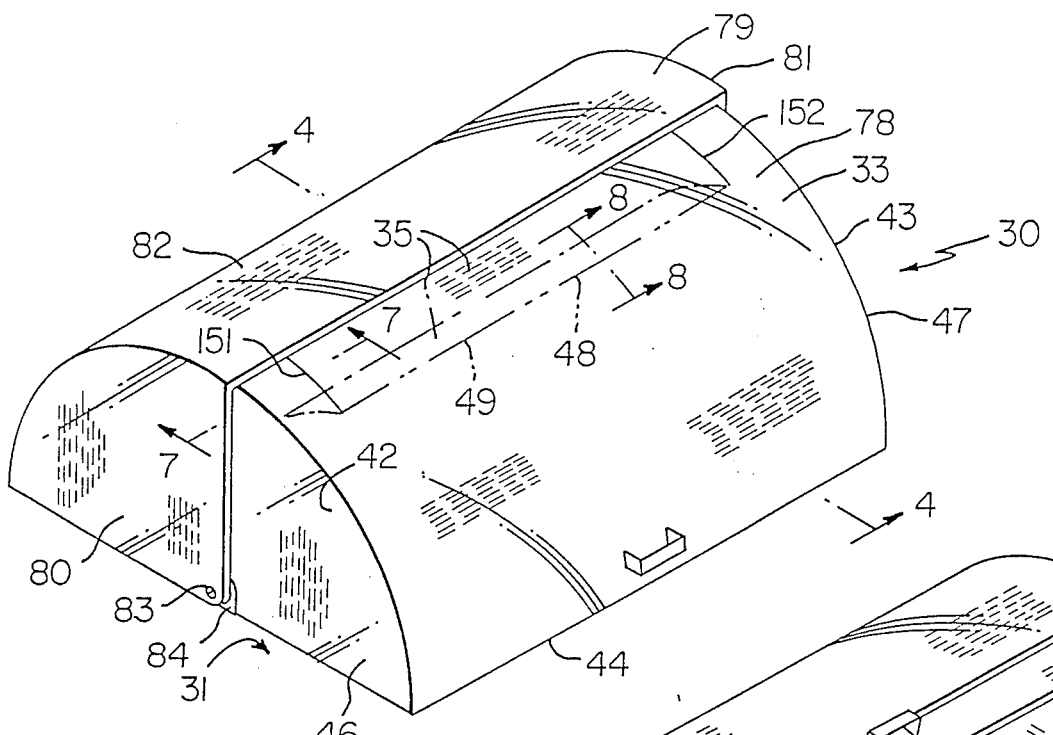
FIG. 1 is a perspective view of the new ventilating cold frame construction of this invention with the cold frame construction being disposed in its closed condition, the vent flap means for the cold frame construction being shown in its closed condition by full lines and in its open position by dash-dotted lines.

While the various features of this invention are hereinafter illustrated and described as being particularly adapted to provide a ventilating construction for a cold frame construction or for a foundation wall, it is to be understood that the various features of this invention can be utilized singularly or in various combination thereof to provide a ventilating construction for other structures as desired.

Therefore, this invention is not to be limited to only the embodiments illustrated in the drawings because the drawings are merely utilized to illustrate some of the wide variety of uses of this invention.

Referring now to FIGS. 1-4, one embodiment of the new ventilating construction of this invention is generally indicated by the reference numeral 30 and comprises a cold frame construction that is adapted to be disposed on the ground 31 or other suitable supporting structure for the purpose of protecting growing plants 32 that are adapted to also be disposed on the ground 31 and within the cold frame construction 30 as is well known in the art.

Figure 4:
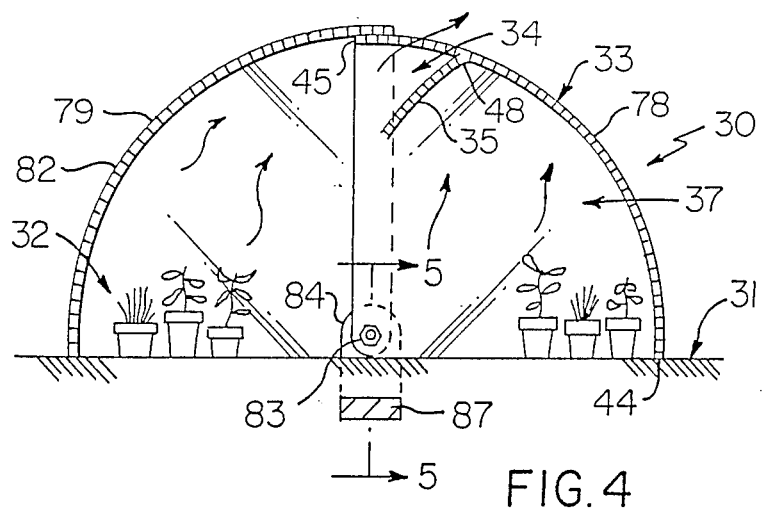
FIG. 4 is a cross-sectional view taken on line 4—4 of FIG. 1 and illustrates the vent flap means thereof in the open position thereof.
Figure 12:
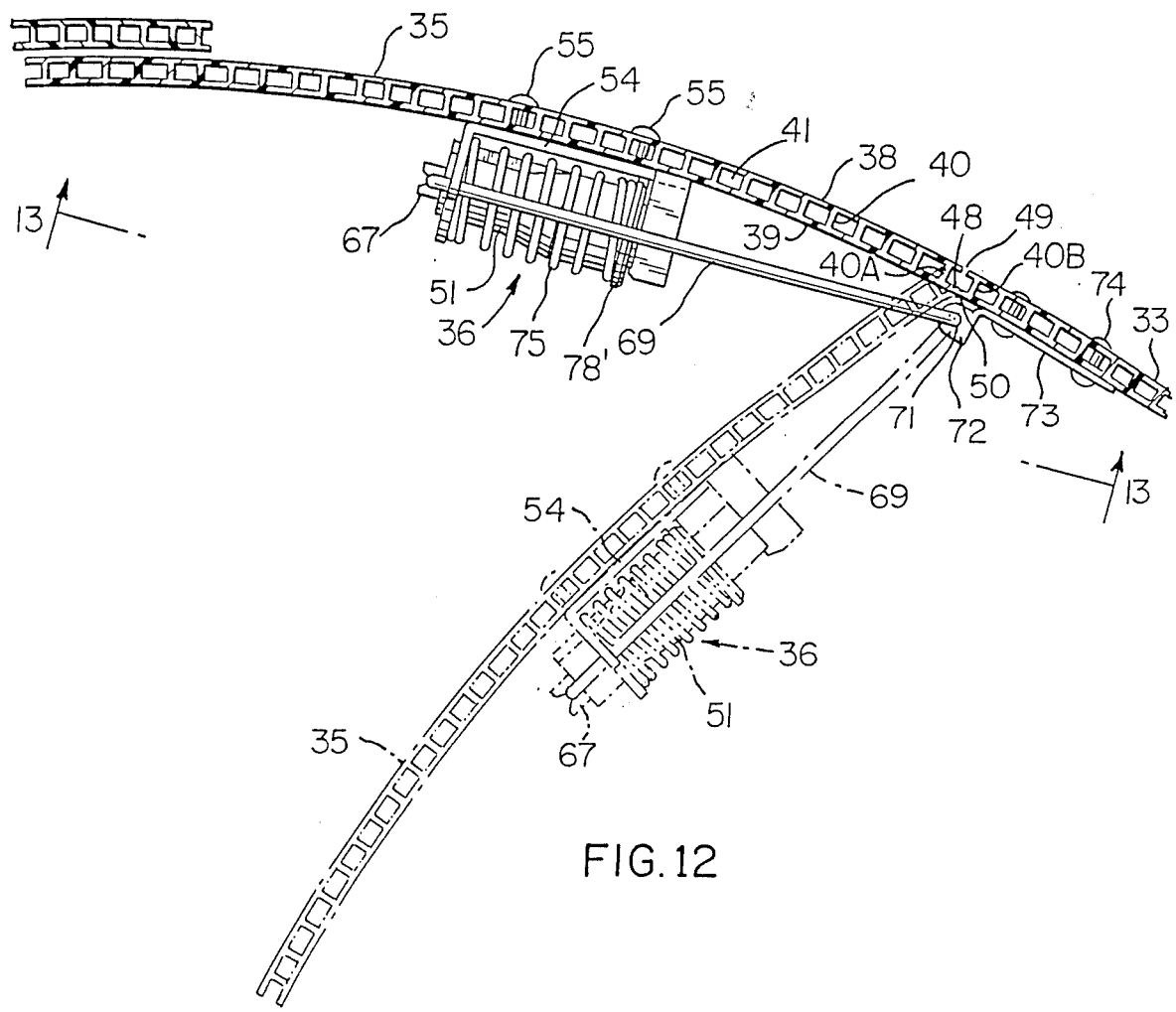
FIG. 12 is an enlarged fragmentary cross-sectional view taken on line 12—12 of FIG. 1 and illustrates the thermally operated actuator means and flap means of the ventilating construction of the cold frame construction of FIG. 1 in the closed condition thereof by full lines and in the open condition thereof by dash-dotted lines.
Figure 14:
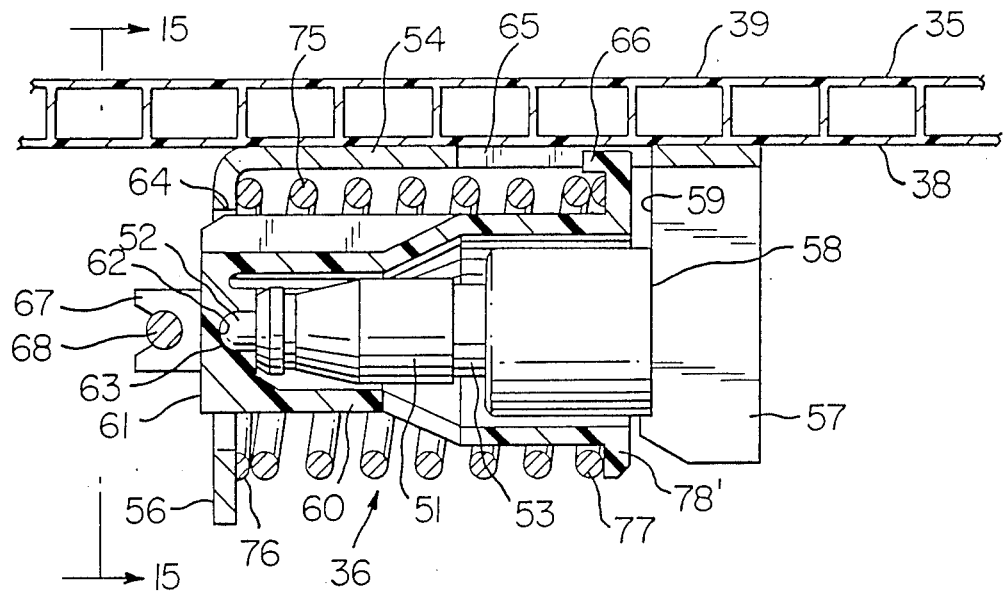
FIG. 14 is an enlarged cross-sectional view taken on line 14—14 of FIG. 13 and illustrates the thermally operated actuator means of the cold frame construction of this invention.
Figure 15:
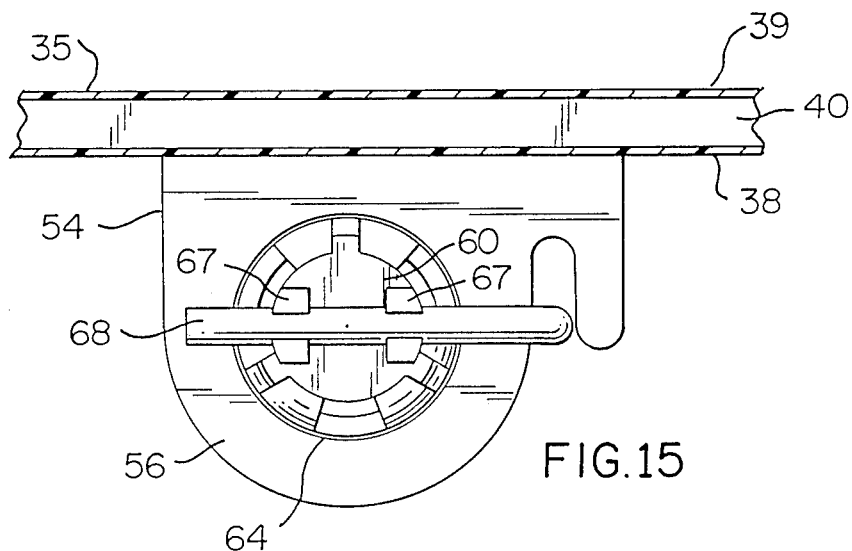
FIG. 15 is a cross-sectional view taken on line 15—15 of FIG. 14.

The ventilating cold frame construction 30 comprises a sheet 33 of material and having an opening means 34, FIG. 4, therethrough and a flap means 35 hinged to the sheet 33 for opening and closing the opening means 34, and a thermally operated actuator means 36, FIG. 12 and 14, operatively interconnected to the sheet 33 and to the flap means 35 to control the position of the flap means 35 relative to the opening means 34 in response to the temperature sensed by the actuator means 36.

It can readily be seen in FIG. 4 that the ventilating cold frame construction 30 defines a chamber 37 therewithin and above the ground 31 which has its temperature sensed by the thermally operated actuator means 36 as the same is disposed inside the chamber 37 so that when the temperature in the chamber 37 reaches a certain temperature, the actuator means 36 opens the flap means 35 in the manner illustrated by dash-dotted lines in FIG. 12 so that the heated air in the chamber 37 can be vented to the exterior of the cold frame construction 30 and thereby prevent an adverse heating effect on the growing plats 32. Conversely, when the temperature in the chamber 37 falls below that predetermined temperature, the thermally responsive actuator 36 moves the flap means 35 to its closed position to close the opening 34 and thereby prevent cold air from entering into the chamber 37.

Thus, it can be seen that the flap means 35 is automatically operated by the actuator means 36 with the actuator 36 controlling the position of the flap means 35 relative to the opening 34 to tend to control the temperature within the chamber 37 for a reason well known in the art which need not be further discussed as the use of automatically vented cold frames, greenhouses and other structures are well known in the art.

The sheet 33 comprises a commercially available twin wall glazing material that has been utilized for greenhouse glazing, etc. because of its shatterproof characteristics as well as its twin wall heat insulating characteristics among other well known characteristics thereof, such as its transparent or translucent characteristics, etc.

In particular, the wall 33 comprises two like walls 38 and 39 of polymeric material disposed in spaced apart substantially parallel relation with a plurality of spaced apart and substantially parallel ribs or flutes 40 of like polymeric material disposed between the walls 38 and 39 and interconnected thereto whereby the ribs 40 and walls 38 and 39 define a plurality of air spaces 41 which extend the length of the sheet 33 in one direction thereof with the air spaces 41 having substantially rectangular transverse cross-sectional configurations as illustrated in FIG. 12. In one working embodiment of this invention, the walls 38 and 39 and ribs 40 are each approximately 6 mm thick and the sheet 33 is approximately one-fourth of an inch in thickness. The walls 38 and 39 and ribs 40 are formed from polymeric material, such as polycarbonate, and the sheets 33 are commercially available as the same are sold under various trademarks or trade names by various manufacturers. For example, such a sheet is sold under the trade name or trademark "Thermoclear" by the General Electric Company and is sold under the trade name or trademark "Exolite" by Cyro Industries, of Wood Cliff Lake, N.J.

Figure 3:
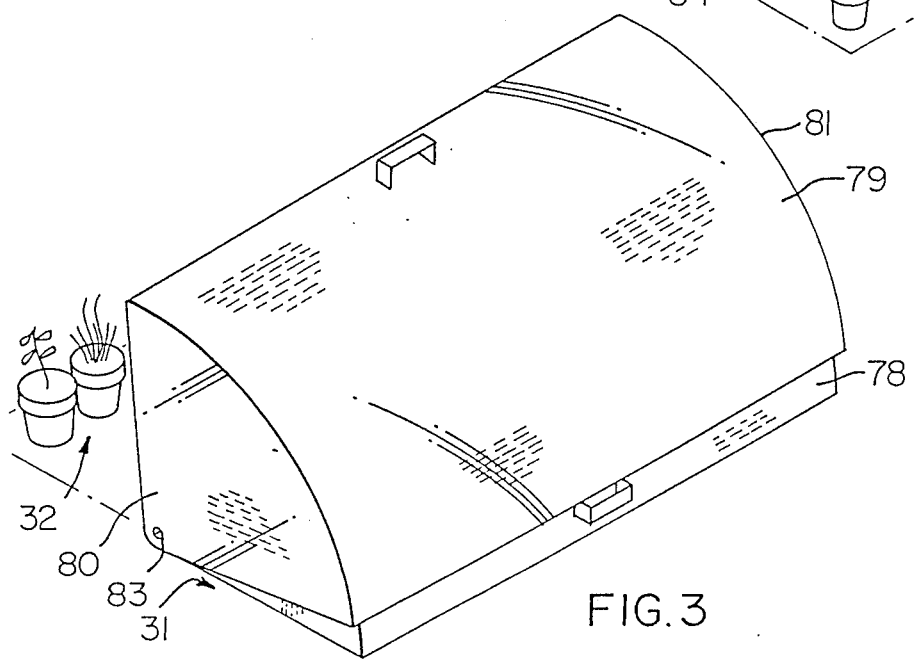
FIG. 3 is a view similar to FIG. 1 and illustrates the other unit of the cold frame construction in the open position thereof.

The sheet 33, when being utilized to form part of the cold frame construction 30, is substantially rectangular as illustrated in FIG. 3 and has a pair of opposed side ends 42 and 43 and a pair of opposed free ends 44 and 45 that join the side ends 42 and 43 substantially at right angles thereto as illustrated in FIG. 4, the sheet 33 having been heated and then formed into substantially a quarter of a circle as illustrated in FIG. 4 so that the end 44 thereof is adapted to rest on the ground 31 and the end 45 thereof will be disposed at the furthest point above the ground 31 as illustrated in FIG. 4. The sheet 33 has opposed side walls 46 and 47 secured to the side ends 42 and 43 thereof in a manner hereinafter set forth.

The flap means 35 of the sheet 33 comprises a section of the sheet 33 that is uniquely cut therefrom in a manner hereinafter set forth so that the flap means 35 has a hinge means 48 that is integral and one-piece with the sheet 33 to form a natural hinge therewith and permit the flap means 35 to move relative thereto.

Figure 8:
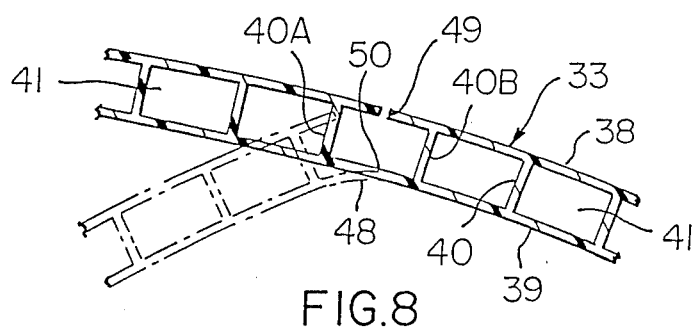
FIG. 8 is an enlarged fragmentary cross-sectional view illustrating the hinge means of the flap means of the cold frame of this invention and is taken substantially on line 8—8 of FIG. 1.

In particular, it can readily be seen in FIGS. 8 and 12 that the outer wall 38 of the sheet 33 has a straight cut 49 extending therethrough and medially between a pair of adjacent ribs 40A and 40B thereof with the wall 39 between the ribs 40A and 40B not being cut so that the part 50 of the wall 39 between the ribs 40A and 40B becomes a natural hinge that is adapted to flex to permit the flap 35 to move between the closed position illustrated in full lines in FIG. 12 to the fully open position illustrated by the dash-dotted lines in FIG. 12 by the actuator means 36 in a manner hereinafter set forth.

Figure 7:
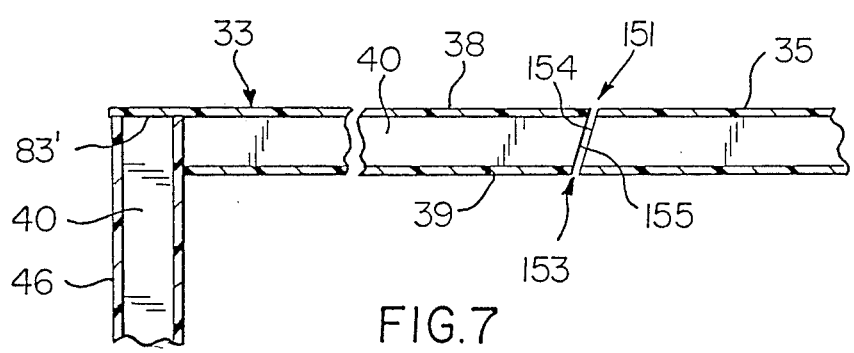
FIG. 7 is a view similar to FIG. 6 and illustrates the side wall secured to the outer wall means, FIG. 7 being taken on line 7—7 of FIG. 1 and being an enlarged view thereof.

In order to form the flap 35 of the sheet 33, the wall 38 of the sheet 33 has a three-sided cut provided therethrough with one side of the cut being the cut 49 and the other two sides of the three-sided cut being transverse cuts 151 and 152 that extend through the wall 38 from the cut 49 to the free end 45 of the sheet 33. In addition, the inner wall 39 of the sheet 33 is cut through by cuts 153, FIG. 7, that respectively join with the cuts 151 and 152 at an angle through the associated ribs 40 so that the associated ribs 40 have angled ends 154 which cause the cut ribs 40 to have substantially trapezoidal configurations as illustrated in FIG. 7 and cause the ends 154 of the cut ribs 40 to abut against adjacent cut ends 155 of the associated ribs 40 of the remaining sheet 33 so as to prevent the flap means 35 from moving through the opening 34 beyond the closed position illustrated in FIG. 4.

Therefore, it can be seen that it is one feature of this invention to form a flap means 35 from the sheet 33 by cutting a section 35 of the sheet 33 therefrom in a unique manner to define the opening means 34 and have one edge 50 of the section 35 being uncut so as to be integral and one-piece with one 39 of the walls 38 and 39 of the sheet 33 to provide a natural hinge 48 therewith which can flex over and over again to open and close the flap means 35 under the control of the actuator means 36 in a manner hereinafter set forth.

Figure 16:
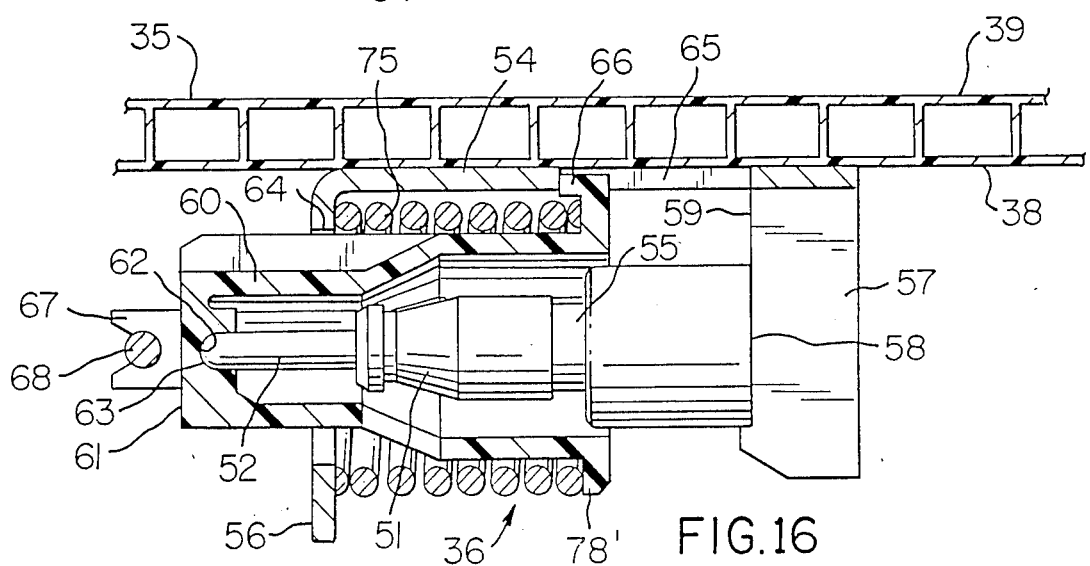
FIG. 16 is a view similar to FIG. 14 and illustrates the thermally operated actuator means in an extended condition thereof.
Figure 17:
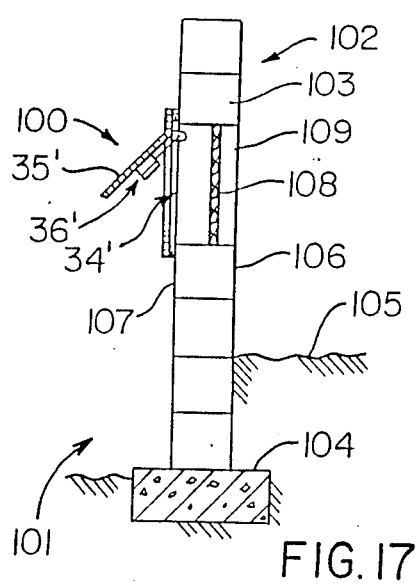
FIG. 17 is a schematic side view of a building foundation wall carrying another embodiment of the ventilating construction of this invention.

While the thermally operated actuator means 36 can comprise any suitable structure, the thermally operated actuator means 36 illustrated in the drawings comprises a conventional thermally actuatable piston and cylinder unit 51 that has a piston 52 disposed in a cylinder member 53 that contains a wax charge or the like that will expand upon sensing a certain predetermined temperature to cause the piston 52 to extend out of the cylinder 53 in the manner illustrated in FIG. 16 and in a manner conventional in the art. Conversely, when the temperature being sensed by the unit 51 falls below the predetermined temperature, the expanded wax charge therein contracts or collapses so that the piston 52 is adapted to be retracted into the cylinder 53 from its extended condition of FIG. 16 back to its collapsed condition of FIG. 14 under the force of a compression spring or the like in a manner conventional in the art. For example, see the U.S. Pat. No. 4,291,449 to Williamson, whereby this patent is being incorporated into this disclosure by this reference thereto.

A metallic bracket member 54 is secured to the wall 39 of the flap means 35 in any suitable manner, such as by the rivet-like fastening members 55 illustrated in FIG. 12, the bracket 54 having opposed tangs 56 and 57 disposed in spaced apart relation.

An end wall 58 of the unit 51 abuts against a surface 59 of the tang 57 so as to prevent movement of the cylinder 53 of the unit 51 to the right as illustrated in FIGS. 12-16.

A cup-shaped retainer 60 formed of polymeric material is telescoped over the unit 51 and has its closed end 61 provided with a recess 62 which receives an end 63 of the piston 52 therein, the closed end 61 of the cup-shaped retainer 60 being adapted to project through an opening 64 formed through the tang 56 of the bracket 54. The bracket 54 has notch means 65, FIG. 14, that receives a spline-like extension means 66 of the cup-shaped retainer 60 therein so as to prevent rotational movement of the cup-shaped retainer 60 while permitting axial movement of the same relative to the bracket 54 until the extension hits the end of the slot 65 as illustrated in FIG. 16.

The end 61 of the retainer 60 has projections 67 extending therefrom and being adapted to snap fittingly receive a bent end 68 of a rod 69 therein so as to move the rod 69 in unison therewith, the rod 69 being substantially U-shaped so as to define another bent end 70 thereof that is adapted to be received through suitable openings 71 formed through projections 72 of a bracket 73 that is fastened to the sheet 33 at a point beyond the hinge area 50 thereof by suitable fastening means 74 as illustrated.

The mechanical advantage provided by the position of the end 70 of the rod 69 relative to the hinge 50 and to the thermally responsive device 36 is such that when the piston 52 of the unit 51 is extended from the collapsed position illustrated in FIG. 14 to the position illustrated in FIG. 16 by the expanded charge in the unit 51, the flap means 35 is moved from its closed position to its fully open position as illustrated in FIG. 12. Conversely, when the piston 52 is being urged back into the cylinder 53 from its extended condition illustrated in FIG. 16 to its fully collapsed or retracted position illustrated in FIG. 14 by a compression spring 75 having one end 76 bearing against the tang 56 of the bracket 54 and the other end 77 thereof bearing against a flange 78' of the cup-shaped retainer 60, the rod 69 causes the flap means 35 to move from its open position to its fully closed position as illustrated in FIG. 12 wherein the flap means 35 is in its normal relationship with the remainder of the sheet 33 to form the quarter circle arrangement as illustrated in FIG. 4.

Therefore, it can be seen that the thermally operated actuator means 36 is adapted to open and close the flap means 35 of the sheet 33 in response to the temperature being sensed by the thermally operated actuator means 36 and by selecting the desired wax charge that is contained within the unit 51, the flap means 35 will open when the thermally responsive device 51 is sensing a certain predetermined temperature within the chamber 37 of the cold frame 30 so as to tend to prevent the chamber 37 of the cold frame 30 from exceeding that predetermined temperature. Conversely, the actuator 36 causes the flap means 35 to close as the temperature within the chamber 37 of the cold frame 30 falls to that predetermined temperature from a higher temperature thereof. For example, in one working embodiment of the cold frame construction 30 of this invention, the unit 51 utilized opens the flap means 35 when the unit 51 senses a rising temperature of approximately 70° F. to 75° F. and closes the flap means 35 when the unit 51 senses a falling temperature of approximately 70° F. to 75° F.

It can be seen that the sheet 33 and side wall means 46 and 47 provide one unit 78 of the cold frame 30 while a similar unit 79 completes the cold frame 30 except for the means for pivotally mounting the units 78 and 79 together as well as the means for anchoring the units 78 and 79 in their pivotally mounted manner to the ground 31 as hereinafter set forth.

Nevertheless, the units 78 and 79 are formed in substantially the same manner except that the unit 79 does not have the ventilating flap means 35 previously described for the unit 78 and the unit 79 is slightly larger than the unit 78 for a purpose hereinafter set forth.

As previously stated, the side walls 46 and 47 for the unit 78 as well as the side walls 80 and 81 and outer wall means 82 for the unit 79 are formed from the same twin wall glazing material as the sheet 33 with the side walls 46, 47, 80 and 81 respectively having the ribs 40 thereof extending substantially vertically upwardly when the units 78 and 79 are in the closed condition as illustrated in FIGS. 1 and 4 whereas the ribs 40 of the sheet of material 33 of the unit 78 and the sheet of material 82 of the unit 79 extend in a direction that is transverse to the end or side walls 46, 47 and 80, 81.

Figure 6:
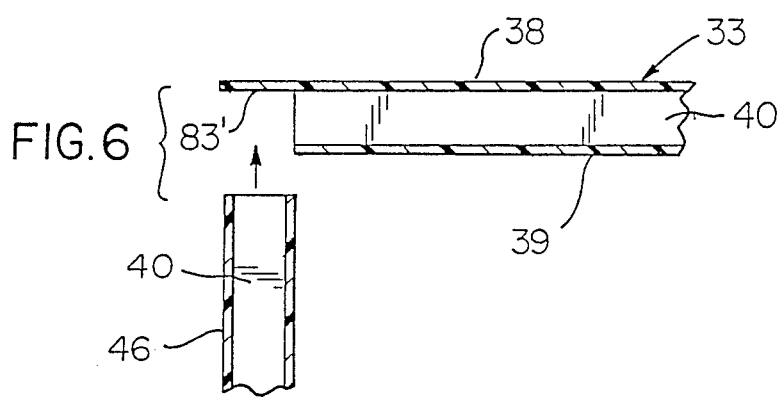
FIG. 6 is an enlarged fragmentary cross-sectional view illustrating one step in the method of this invention for joining a side wall of one of the units of the cold frame construction to an outer side wall means thereof.

One method of this invention for fastening the end walls 46 and 47 to the sheet 33 as well as the end walls 80 and 81 to the sheet 82, is to first remove the inner wall 39 and associated ends of the ribs 40 of the sheet 33 for a distance inwardly from the end edges 42 and 43 thereof that is approximately the thickness of the walls 46 and 47 as illustrated in FIG. 6 so that the particular end wall 46 or 47 can be disposed against the wall section 83' and be secured thereto by any suitable adhesive, such as a solvent or the like in a manner well known in the plastic fabricating art. In this manner, it can be seen from FIG. 7 that a relatively strong structural relationship is provided between the ribs 40 of the sheet 33 and the ribs 40 of associated end wall 46 or 47 so that the particular unit 78 or 79 can be moved as a self-contained member as will be apparent hereinafter. In addition, it can be seen that the air spaces 41 of the sheet 33 and end walls 46 and 47 are respectively sealed closed at the secured together ends thereof for good heat insulation purposes.

Figure 2:
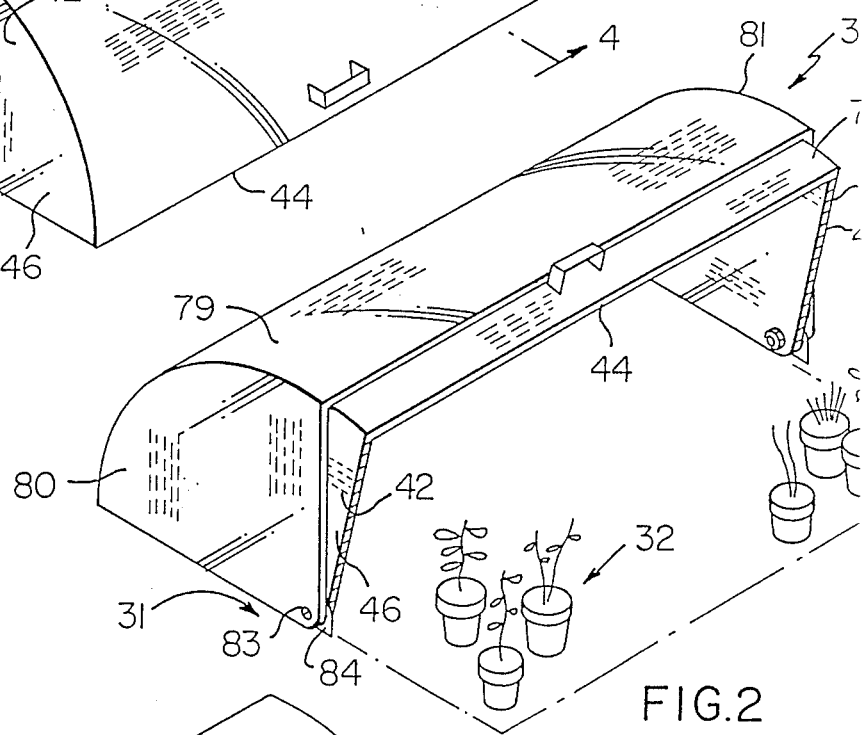
FIG. 2 is a view similar to FIG. 1 and illustrates one unit of the cold frame construction of FIG. 1 in an open position thereof.
Figure 5:
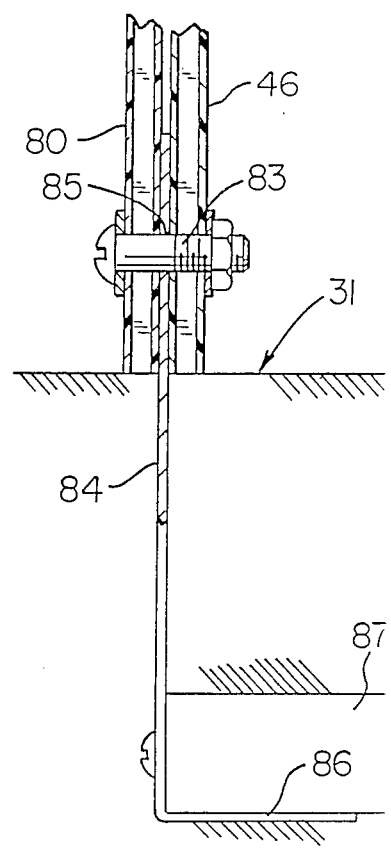
FIG. 5 is an enlarged fragmentary cross-sectional view taken on line 5—5 of FIG. 4.

The units 78 and 79 are adapted to have their adjacent open ends overlap in the manner illustrated in FIG. 4 as the radius of the arc described by the sheet 33 of the unit 78 is slightly smaller than the radius of the arc defined by the sheet 82 of the unit 79. In this manner, the unit 78 is adapted to be pivoted into the unit 79 as illustrated in FIG. 2 or the unit 79 is adapted to be moved over the unit 78 in the manner illustrated in FIG. 3, the units 78 and 79 being pivotally interconnected together by pivot pin means 83 as illustrated in FIGS. 4 and 5 with each pin means 83 joining the overlapping portions of the adjacent side walls 46 and 80 and 47, 81 of the units 78 and 79 as illustrated.

In addition, elongated mounting plates 84 are respectively disposed between the overlapping portions of the side walls 46, 80 and 47, 81 and respectively have opening means 85 passing therethrough and receiving the respective pivot pins 83 therethrough so that the plates 84 are carried by the interconnected units 78 and 79 on the pivot pins 83 thereof. Each plate 84 has an L-shaped end portion 86 that is secured to an adjacent end of a length or rib of wood 87 that is adapted to be buried in the ground 31 in the manner illustrated in FIGS. 4 and 5 so as to anchor the cold frame 30 to the ground 31 while still permitting the units 78 and 79 to pivot relative to each other and relative to the ground 31 in the manner illustrated in FIGS. 2 and 3 so as to provide access to the plants 32 when desired. However, the plates 84 and anchoring board 87 tend to prevent the wind from blowing over the cold frame 30 when the board 87 is buried in the ground in the manner illustrated in FIGS. 4 and 5.

Therefore, it can be seen that it is a relatively simple method of this invention to make the cold frame construction 30 of this invention to operate in the manner previously described wherein the flap means 35 will automatically open inwardly to provide an opening 34 leading to the chamber 37 to vent the chamber 37 to the exterior of the cold frame construction 30 should the temperature in the chamber 37 exceed a predetermined temperature. Conversely, the flap means 35 will be automatically returned to the closed position as illustrated by full lines in FIG. 1 when the temperature in the chamber 37 falls below the predetermined temperature for the reasons previously set forth.

Figure 9:
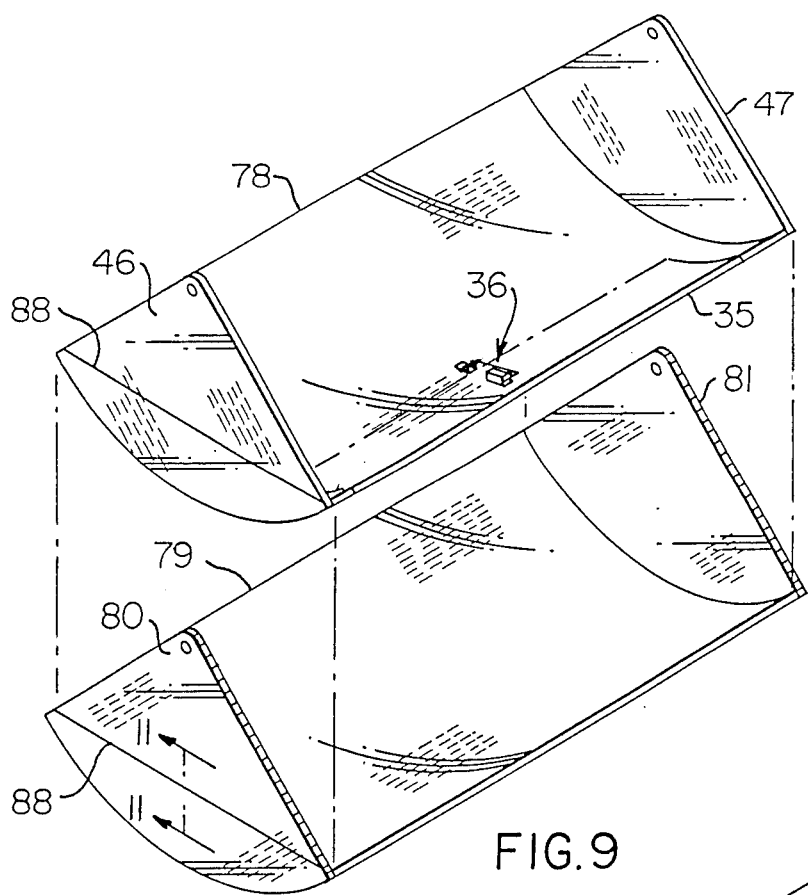
FIG. 9 is an exploded perspective view illustrating how one of the units of the cold frame construction of FIG. 1 will nest within the other unit thereof for shipping and/or storing purposes.
Figure 10:
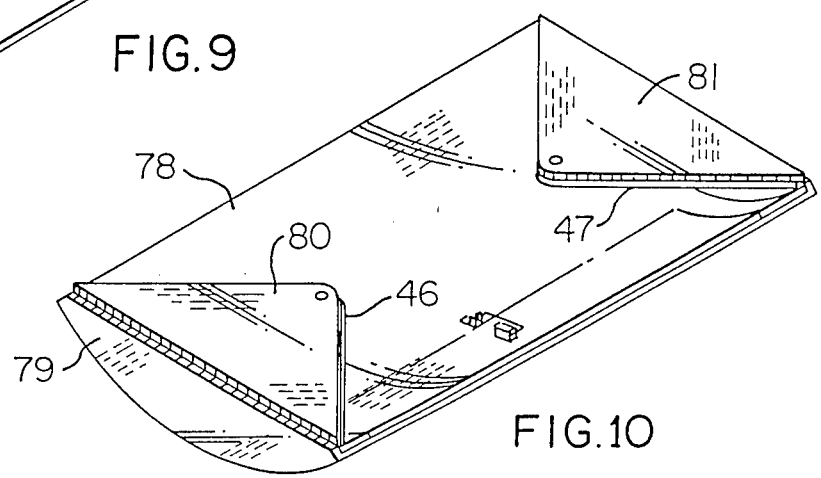
FIG. 10 is a view similar to FIG. 9 and illustrates the units of the cold frame construction in their nested condition and with the side walls thereof disposed in their folded in conditions.
Figure 11:
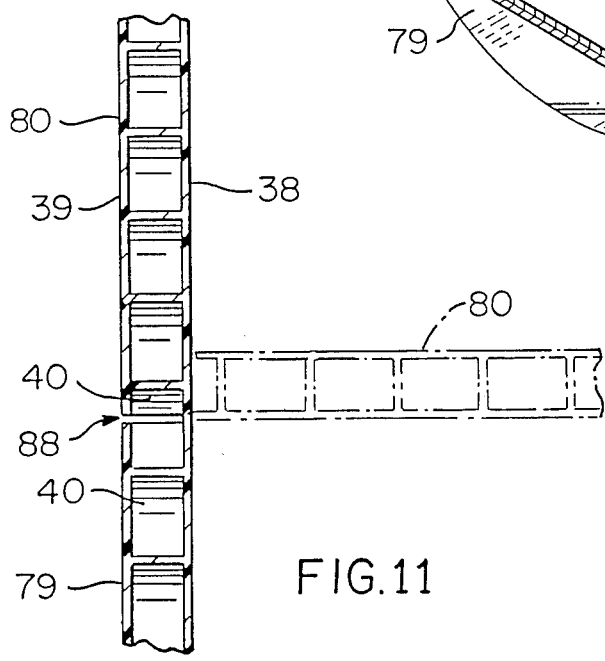
FIG. 11 is an enlarged fragmentary cross-sectional view taken on line 11—11 of FIG. 9 and illustrates the side hinge structure.
Figure 9A:
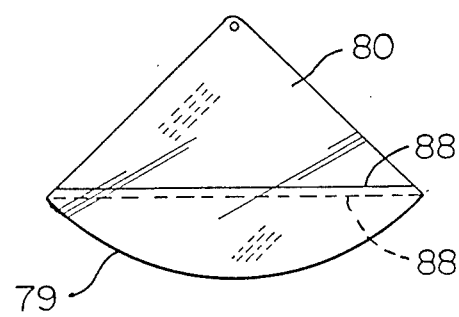
FIG. 9A is a fragmentary end view of the nested side walls of the units of FIG. 9 and illustrates how the adjacent side walls are adapted to be folded inwardly to the position of FIG. 10.

Because the unit 78 is adapted to nest within the unit 79, the side walls 46, 47 and 80, 81 of the respective units 78 and 79 can be formed to fold in the manner illustrated in FIGS. 10 and 11 by first nesting the unit 78 within the unit 79 in the manner illustrated in FIGS. 9 and 10 and then folding over the side walls 46, 47 and 80, 81 as the same have the outer walls 39 thereof cut through by respective straight cuts 88 that cut through the associated ribs 40 thereof but does not cut through the walls 38 thereof, the straight cuts 88 being substantially offset as illustrated in FIGS. 9 and 9A. The cut line 88 for the associated side walls 46 and 47 of the unit 78 are spaced below the cut lines 88 of the associated side walls 80 and 81 of the outer unit 79 when the units 78 and 79 are disposed in the nested relation illustrated in FIG. 9A so that the side walls will fold over in the manner illustrated in FIG. 10 so as to provide a compact arrangement for shipping or storing the cold frame construction 30 which can be subsequently readily erected to form the completed cold frame construction 30 in the manner previously set forth.

Thus, it can be seen that the side walls 46, 47 and 80, 81 of the units 78 and 79 also have natural hinges 88 defined by the uncut walls 38 thereof as illustrated in FIG. 11 which permit the same to be folded in the manner previously set forth. However, when the side walls are erected into the vertical manner to complete the cold frame construction 30, the side walls are held in the vertical position and cannot fold inwardly because of the spaced apart plates 84 which are anchored in the ground 31 and the ends of the cut ribs 40 abut against each other to provide columnar support for the respective side wall in its erected condition.

In one working embodiment of the cold frame construction 30 of this invention, the same provides an overall size of approximately 44"×36"×18" high with the flap means 35 being approximately 6" wide and opening-closing when the internal temperature sensed by the thermally operated actuator means 76 is approximately 70° F. to 75° F. as previously set forth.

Not only is the twin wall glazing material, such as sheet 33, of the cold frame construction 30 of this invention much stronger than material commonly utilized in cold frames and have much greater insulating properties, the twin wall glazing material selected can be completely transparent or translucent as desired with the resulting cold frame construction 30 of this invention having good wind resistance because of its aerodynamic shape coupled with its effective ground anchoring means so that it is believed that the cold frame 30 of this invention is substantially stable even in winds exceeding 60 miles per hour.

By utilizing such twin wall glazing material it can be seen that the natural hinges of the cold frame construction 30 are formed by merely severing one wall of the material, such as parallel to the flute or rib direction so as to create out of one piece, two sections connected by an integral hinge 48 eliminating attachments and separate pieces making for a very inexpensive construction. Cutting out the section on an angle yields a positive closure seat and this coupled with the hinge construction results in perfect alignment for opening and closing of the material as provided by the flap means 35 of this invention.

Cutting across the ribs 40 of the twin wall glazing material, such as for the side wall means of the cold frame construction 30, either at 90° or at 45° but leaving one wall or face uncut, forms a hinge 88 which allows the structure to be folded out of the way and then restored to its upright position retaining its original rigidity in the direction opposite to the folding direction. Thus, an important aspect of this invention involves restoring to opposite ends in opposing direction and attaching both to a rigid member (the wood piece 87 as shown) restores the rigidity of the entire structure since each end opposes the folding of the other. This is of great significance since the geometry of the cold frame construction (the staggered cuts coupled with the nesting construction) allows the entire cold frame construction to be shipped in a relatively small box which can be shipped inexpensively by conventional carriers.

The integral hinged vent flap 35 and the thermally operated actuator means 36 of this invention have been designed such that the vent flap means 35 swings down from the inner rotating unit 78 when opening the vent opening 34. The thermally operated actuator means 36 is on the underneath side of the unit 78 so that neither it nor the vent flap 35 interferes with the nesting feature of this invention which makes the cold frame construction 30 of this invention so easy to use and the inside so readily accessible.

In addition, the cut out edges of the cover sheet 33 or 82 as previously described in connection with FIGS. 6 and 7 allows the sides to be welded by solvent or the like thereto and also allows the inner air spaces 41 for both the cover and end pieces to be simultaneously closed off which is essential to good insulation.

Referring now to FIGS. 17-20 another ventilating construction of this invention is generally indicated by the reference numeral 100 and parts thereof similar to the ventilating construction 30 previously described are indicated by like reference numerals followed by a prime mark.

The ventilating construction 100 of this invention comprises an automatic venting underhouse vent arrangement utilized for venting a crawl space 101 of a building or home 102 that has a foundation wall 103, such as a cinderblock foundation wall, supported on a footer 104 disposed in the ground 105. The wall 103 has an exterior side 106 and an interior side 107 which defines the crawl space 101.

It is well known that on houses or buildings constructed with crawl spaces, it is desirable to prevent humidity buildup with the resulting rot damage which it can cause, and to prevent the problems of termites, fungus and other pests which like dark, humid areas. Houses are thus constructed with a multiplicity of vent areas to ventilate the crawl space to cut down on these problems. These problems are at a maximum during the warm months. It is also desirable during the winter to close the vents for energy conservation since a significant amount of heat can be lost into a cold crawl space. Some lending agencies prohibit the use of manually opening and closing vent grills in homes because of the potential of their being left closed year round.

Several automatic vents are now available to address the above problem. They are all similar in construction and consist of three or more louvres which are actuated by a bimetallic spring which modulates the louvres between closed at approximately 40° F. and open at approximately 70° F. They are housed in a frame which includes a grill and screen to exclude insects, such as the grill or screen 108 illustrated in FIG. 17 and being disposed in an opening means 109 passing through the foundation wall 103 from the crawl space 101 to the exterior side 106 of the wall 103.

These prior known vents are installed in old construction (approximately 90% of the usage) by knocking out the old grill or screen (such as grill or screen 108 of FIG. 17 and normally installed when the house is built) and inserting the new one in its place. These prior known units are expensive, tend to have high leakage of air even in the closed position, are slow to operate, are weak because the bimetal has low power so that the slightest friction or interference by insect nests or spider webs may cause them to fail to operate, have inferior temperature sensing because the thermostatic bimetal senses both outside and underhouse temperature rather than sensing the outside temperature only so that they have a tendency to open as the air temperature under the house raises, are sensitive to wind which could make them sense the underhouse temperature primarily if not exclusively so that they would open to release the heat they are designed to conserve, etc.

It is believed that the ventilating construction 100 of this invention overcomes all of the previous stated weaknesses of the prior known automatic vent constructions as will be apparent hereinafter.

Figure 19:
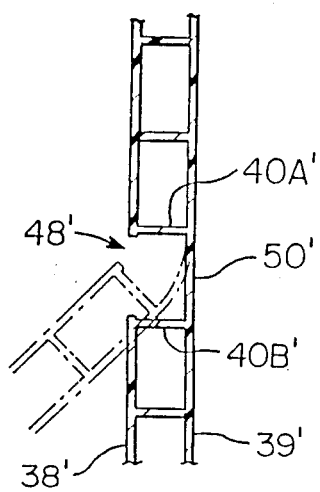
FIG. 19 is an enlarged fragmentary cross-sectional view of the hinge structure of the ventilating construction of FIG. 18.
Figure 20:
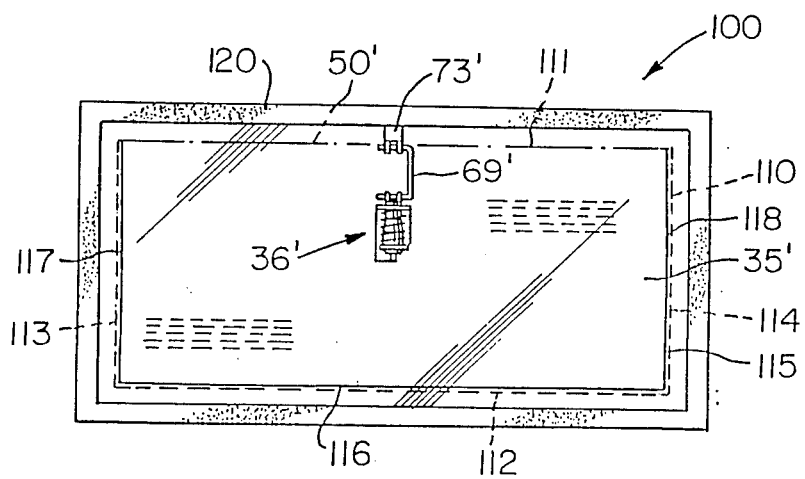
FIG. 20 is a reduced view taken in the direction of the arrows 20—20 of FIG. 18.

The ventilating construction 100 of this invention comprises the sheet 33' previously described except that the sheet 33' is disposed in its substantially flat rectangular configuration as illustrated in FIG. 20 and has a flap means 35', also of substantially rectangular configuration, cut therefrom and being integrally hinged thereto by having the wall 38' completely cut through by a rectangular cut 110 that is defined by opposed top and bottom parallel cuts 111 and 112 and opposed parallel side cuts 113 and 114. However, the top cut 111 actually removes all of the wall 38' between adjacent ribs 40A' and 40B' as illustrated in FIG. 19 so that the remaining uncut section 50' for the flap means 35' which is adapted to pivot in the manner illustrated by dash-dotted lines in FIGS. 18 and 19 to open the flap means 35' and thereby open the resulting opening 34' that exists through the sheet 33' has a cooperating U-shaped cut 115 formed therethrough and defined by a bottom straight cut 116 and opposed side cuts 117 and 118 which respectively interconnect with the cuts 112, 113 and 114 at an angle to define the interfitting relation designated by the reference numeral 119 in FIG. 18 that prevents the flap 35' from being pushed through the opening 34' in the direction of the exterior side 106 of the wall 103.

The previously described thermally operated actuator means 36' is secured to the side 38' of the sheet 33' by the fastening means 55' so as to be disposed on the exterior side of the vent construction 100 and is so arranged that the U-shaped rod 69' interconnects with the bracket 73' that is also mounted on the exterior side 39' of the construction 100 by the fastening means 74'. In this manner, when the thermally operated actuator means 36' has the wax charge thereof heated to a predetermined temperature so as to expand the charge, the cylinder 53' of the thermally responsive device 51' extends relative to the piston (not shown) thereof in the manner illustrated by dash-dotted lines in FIG. 17 and by acting on the bracket 57' and the push rod 69' causes the flap means 35' to pivot on its hinge means 48' to open the flap means 35' inwardly and thereby open the opening 34' passing through the vent means 100. Conversely, as the temperature being sensed by the thermally operated actuator means 36' decreases to the predetermined temperature, the wax charge collapses or contracts and through the force of the compression spring 75' causes the cylinder 53' to collapse or retract over the piston (not shown) of the device 51' and thereby close the flap means 35' in the manner illustrated by full lines in FIG. 18.

Thus, it can be seen that the ventilating construction 100 of this invention is adapted to control the venting of the crawl space 101 by opening the flap means 35' as the outside temperature being sensed thereby increases to a certain level and closes the flap means 35' when the outside temperature falls to the predetermined temperature. However, the unit 51' of the actuator means 36' has its wax charge selected so that the vent flap 35' will open-close when the unit 51' is sensing approximately 50° F. to 55° F. instead of approximately 70° F. to 75° F. for the cold frame construction 30 previously described.

Thus, the ventilating construction 100 of this invention is relatively inexpensive since the frame and vent flap 35' are all one integral part and by not having to remove the present grill 108 from an existing building 102 to utilize the ventilating construction 100 of this invention therewith, the labor and cost of removing the old grill 108 being saved over the prior known arrangement.

Figure 18:
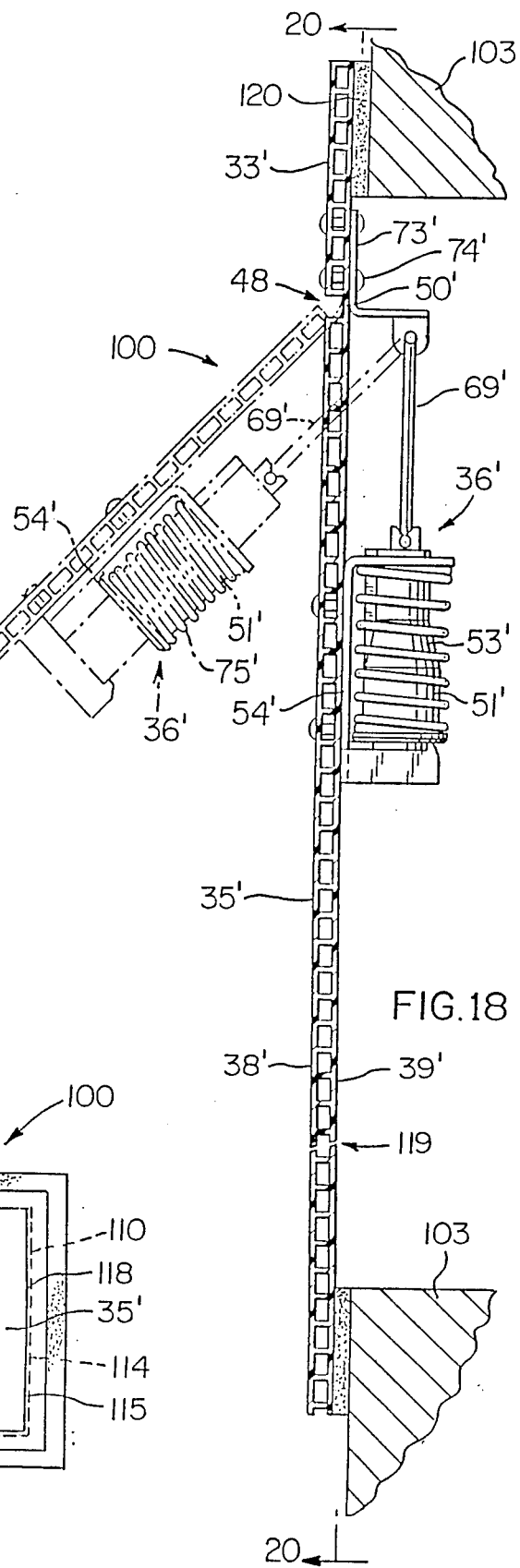
FIG. 18 is an enlarged fragmentary cross-sectional view of the ventilating construction of FIG. 17 and illustrates the flap means of the ventilating construction in the closed condition thereof by full lines and in the open condition thereof by dash-dotted lines.

In addition, installation of the ventilating construction 100 of this invention is inexpensive since all that is required is a removal of four paper masks that cover a high tech double paste foam adhesive strip 120 disposed around the peripheral edge of the side 39' of the sheet 33' which permits the sheet 33' to be effectively press secured to the interior side 107 of the wall 103 as illustrated in FIG. 18. The adhesive 120 will even stick effectively to dry or damp cinder or concrete blocks as it is merely just pressed in place.

The ventilating construction 100 is substantially leak tight as a substantially perfect alignment is achieved by the integral hinge 48' and the angular seat 119 of the flap means 35' together with the high force thermal actuator means 36' and 360° full adhesive 120 that combines to give an almost perfect sealing against air leakage and wind.

The ventilating construction 100 of this invention has a relatively rapid operation because the high force, fast operating short range change of the state of the operator means 36' closes at approximately 50° F. to begin to conserve heat just when it is needed and full opening at approximately 55° F. gives maximum ventilation night and day during summer and on mild days in fall, winter and spring. The temperature range is approximately 5° F. rather than approximately 30° F. for the prior known automatic vents.

The operator 36' of this invention is relatively strong as the thermal operator 36' gives approximately a 10 pound minimum push and pull. This, combined with the frictionless vent flap operation, gives maximum reliability and can overcome any resistance by insect webs.

The ventilating construction 100 of this invention gives ideal temperature sensor location as the actuator means 36' is completely outside when the vent flap 35' is closed and is protected by the twin wall insulating material of the sheet 33' from any effect of the underhouse temperature. Upon opening of the flap means 35', the actuator means 36' is out of the main stream of air flow even when air is flowing from the inside to the outside so that it continues to respond to the outside temperature.

The material of the sheet 33' of the ventilating construction 100 of this invention can be transparent or translucent and thereby allows light in the crawl space 101 whether or not the vent flap means 35' is open or closed. The competitive units block the light when closed and offer considerable shading even when open. However, it is found that light is very important in reducing termite activity and discouraging activity by molds, fungi and bacteria. It is also helpful to the homeowner who usually uses the crawl space for storage since the light allows visibility within the crawl space 101.

The twin wall material of the sheet 33' also gives substantial insulation over prior known vents as the prior known units use a thin sheet of metal which provides almost no insulating effect.

The ventilating construction 100 of this invention provides an opening angle of the vent flap means 35' that achieves near zero resistance to the flow of air through the vent area. The addition of the internal automatic vent of this invention essentially does not change the effective ventilation at all.

In the 10% new construction use of the ventilating construction 100 of this invention, the necessity of buying a standard grill and screen in addition to the internal automatic vent still makes good economic sense since the price of the two combined is still considerably less than the prior known automatic vents alone.

Figure 22:
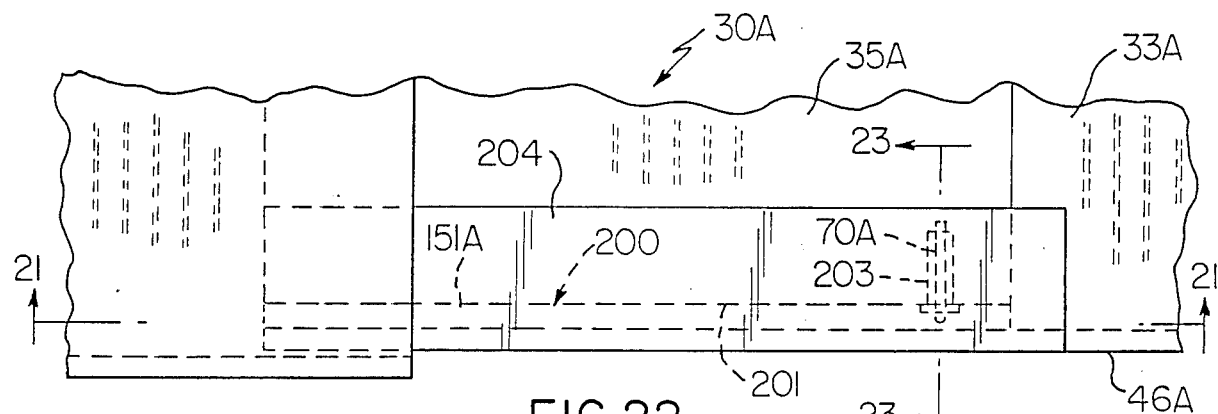
FIG. 22 is a fragmentary top view of the cold frame construction illustrated in FIG. 21 and is taken in the direction of the arrows 22—22 thereof.
Figure 21:
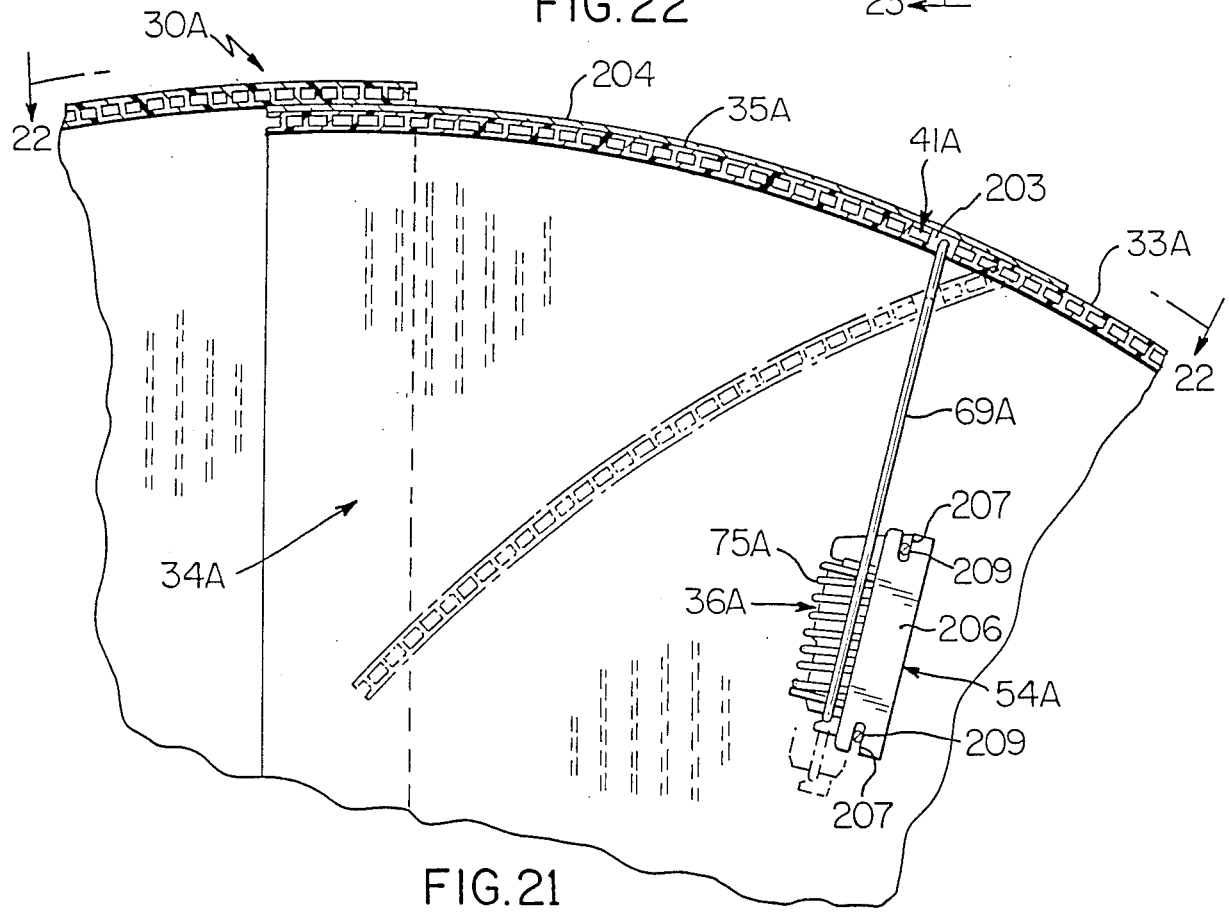
FIG. 21 is a view similar to FIG. 12 and illustrates another embodiment of the ventilating construction of this invention, the ventilating construction comprising a cold frame construction wherein the flap means thereof is illustrated in the closed condition thereof by full lines and in the open condition thereof by dash-dotted lines, FIG. 21 being taken on line 21—21 of FIG. 22.
Figure 23:
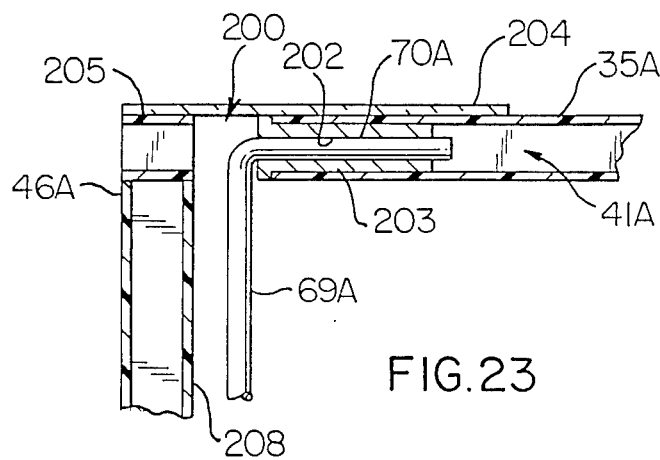
FIG. 23 is an enlarged fragmentary cross-sectional view taken on line 23—23 of FIG. 22.

Referring now to FIGS. 21-23, another embodiment of the new ventilating construction of this invention is generally indicated by the reference numeral 30A and parts thereof similar to the ventilating construction 30 previously described are indicated by like reference numerals followed by the reference letter "A".

As illustrated in FIGS. 21-23, the ventilating construction 30A comprises a cold frame construction similar to the cold frame construction 30 previously described except that the thermally operated actuator means 36A therefor is mounted to the sidewall 46A in a manner hereinafter set forth and the cut 151A that defines one side of the flap 35A of the sheet 33A actually forms a slot 200 between the sidewall 46A and an end 201 of the flap 35A so as to permit an end 70A of the actuator rod 69A to be disposed in the space 200 and be rotatably received within an opening 202 passing through a bushing 203 that has been inserted into one of the passages 41A of the flap 35A as illustrated in FIG. 23 so as to interconnect the push rod 68A to the flap 35A to operate the same between the open and closed positions as illustrated in FIG. 21 in a manner hereinafter set forth. The bushing 203 could be press-fitted into its respective passage 41A or be secured therein in any desired manner, such as by adhesive means or the like.

In order to cover the slot 200 that is defined between the sidewall 46A and the end 201 of the flap 35A and thereby close the inside chamber of the cold frame 30A from the exterior thereof when the flap 35A is in its closed condition, a rectangular sheet 204 of any suitable polymeric material, such as the previously described polycarbonate material, is secured on the top 205 of the end wall 46A by a suitable adhesive or the like and extends over the top of the flap 35A beyond the slot 200 in the manner illustrated in FIGS. 21-23 whereby the flap 35A is adapted to move downwardly to its open position illustrated in FIG. 1 relative to the stationary cover sheet 204 to provide the vent opening 34A for the cold frame construction 30A for ventilating purposes as previously set forth.

Figure 28:
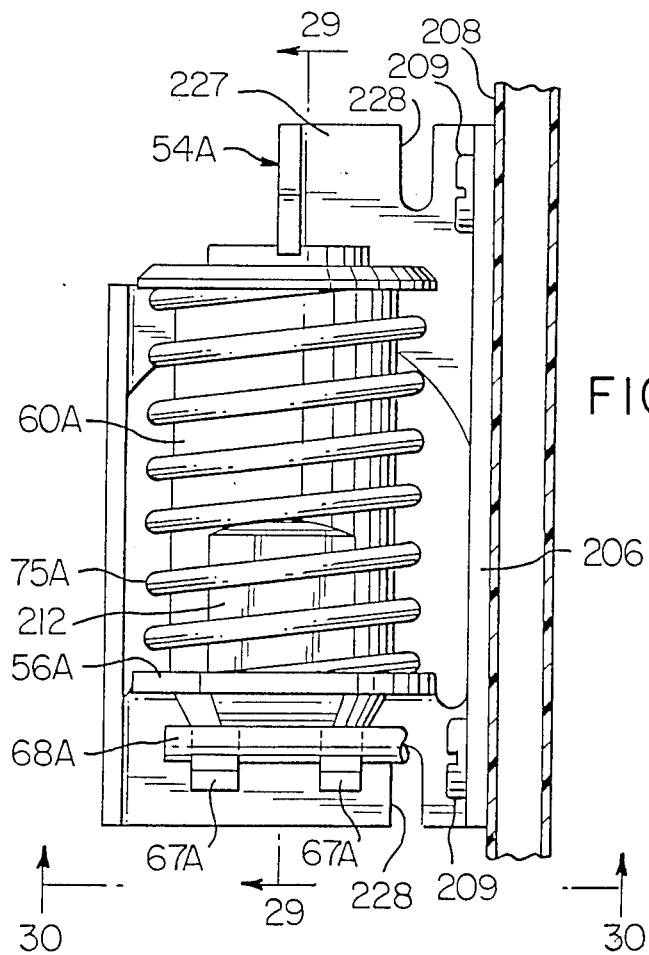
FIG. 28 is an enlarged fragmentary cross-sectional view taken on line 28—28 of FIG. 21 and illustrates the thermally operated actuator means that controls the flap means of the ventilating construction of FIGS. 21-23 as well as the ventilating construction of FIGS. 24-25.
Figure 30:
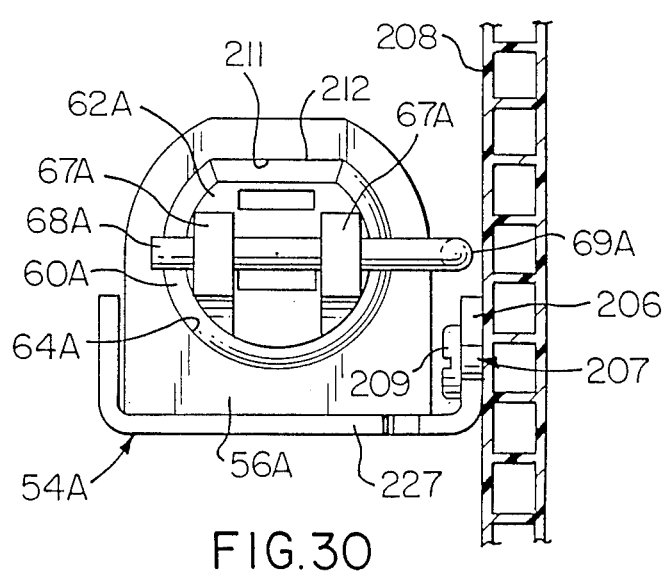
FIG. 30 is a cross-sectional view taken on line 30—30 of FIG. 28 and illustrates an end view of the thermally operated actuator means.

The bracket 54A of the thermally operated actuator means 36A has a side flange 206 provided with notches 207 at each end thereof to permit the same to be secured to the inside surface 208 of the sidewall means 46A by suitable fastening means 209 as illustrated in FIGS. 21, 28 and 30.

Figure 29:
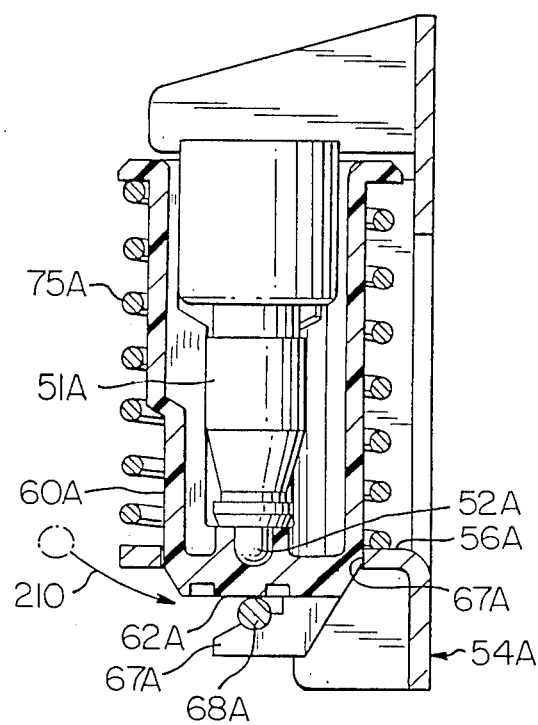
FIG. 29 is a cross-sectional view taken on line 29-29 of FIG. 28.

The cup-shaped retainer 60A of the thermally operated actuator means 36A has the projections 67A thereof so formed that the same cooperate with the end surface 62A thereof to permit the end 68A of the rod 69A to be snap-fitted therein by pivoting the rod 69A in the direction of the arrow 210 in FIG. 29 in order to rotatably attach the end 68A of the rod 69A thereto after the other end 70A of the rod 69A has been inserted in the bushing 203 and the actuator means 36A has been fastened to the sidewall 46A. In this manner, when the piston 52A of the thermally responsive device 51A of the actuator means 36A is extended downwardly in FIGS. 21 and 29, the cup-shaped retainer 60A is likewise moved downwardly in opposition to the force of the compression spring 75A to move the rod 69A downwardly as illustrated by dash-dotted lines in FIGS. 21 and thereby pivot the flap means 35A downwardly to its open position. Conversely, when the piston 52A of the device 51A is permitted to retract into the device 51A under the force of the compression spring 75A in the manner previously described, the rod 69A is moved upwardly by the force of the spring 75A and causes the flap means 35A to move to its closed position as previously set forth.

In order to insure proper orientation of the cup-shaped retainer 60A relative to the bracket 54A, the opening 64A in the end flange 56A of the bracket 54A has a straight section 211 that cooperates with a flat surface 212 formed on the cup-shaped retainer 60A so that the retainer 60A cannot rotate relative to the bracket 54A while moving axially relative thereto.

Therefore, it can be seen that the operation of the cold frame construction 30A is the same as the operation of the cold frame construction 30 previously described so that a further discussion of the operation of the cold frame construction 30A need not be set forth.

However, it can be seen that by mounting the thermally operated actuator means 36A to the sidewall means 46A rather than to the flap 35A as in the cold frame construction 30 previously described, a more stable mounting arrangement for the actuator means 36A is provided by the cold frame construction 30A.

Similarly, such stabilized mounting of the thermally operated actuator means can be provided for the ventilating construction of this invention that is utilized for venting a crawl space.

Figure 24:
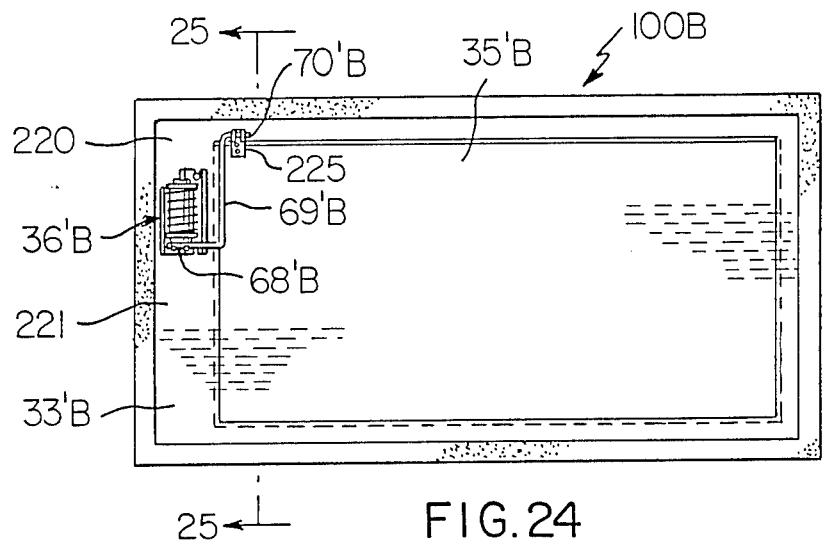
Figure 25:
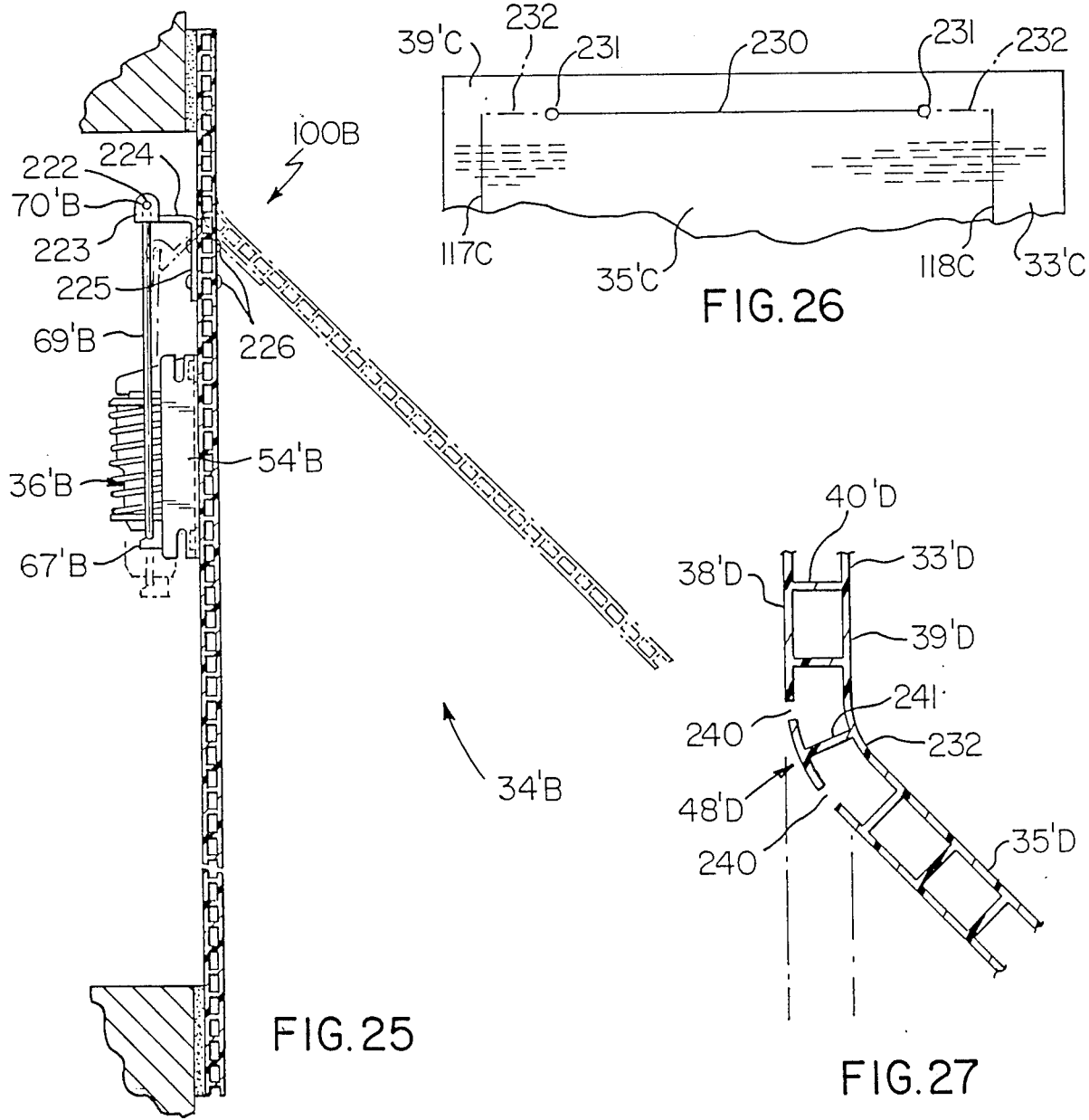
FIG. 25 is an enlarged cross-sectional view taken on line 25—25 of FIG. 24, FIG. 25 illustrating the flap means of the ventilating construction disposed in the closed condition thereof by full lines and in the open position thereof by dash-dotted lines.

In particular, another ventilating construction of this invention is generally indicated by the reference numeral 100B in FIGS. 24 and 25 and parts thereof similar to the ventilating construction 100 previously described are indicated by like reference numerals followed by the reference letter "B".

As illustrated in FIGS. 24 and 25, it can be seen that the ventilating construction 100B is substantially the same as the ventilating construction 100 previously described except that the thermally operated actuator means 36'B, formed in substantially the same manner as the thermally operated actuator means 36A previously described, is mounted to the exterior surface 220 of a portion 221 of the non-flap portion of the sheet 33'B so that the thermally operated actuator means 36'B can operate the flap 35'B in the same manner as in the ventilating construction 100 previously described.

In addition, the rod 69'B of the actuator 36'B is substantially Z-shaped so as to permit the end 70'B thereof to be inserted through suitable openings 222 formed in ears 223 on an L-shaped bracket 224 that has one of the legs 225 thereof fastened to the flap 35'B by suitable fastening means 226. The other end 68'B of the rod 69'B is snap-fitted to the flanges 67'B of the bracket 54'B of the thermally operated actuator means 36'B in the manner previously set forth.

The bracket 54'B of the actuator 36'B is the same bracket 54A illustrated in FIGS. 28-30 and has a bottom plate 227 provided with slots 228 in the opposed ends thereof for mounting the actuator 36'B to the wall section 221 by suitable fastening means, similar to the fastening means 209 previously described, and thereby permit the actuator means 36B to move the rod 69'B downwardly in the manner illustrated by dash-dotted lines in FIG. 25 to pivot the flap means 35'B to the open position as illustrated by dash-dotted lines in FIG. 25 and provide the vent opening 34'B in substantially the same manner and for the same purpose as the vent opening 34' for the ventilating construction 100 previously described whereby a further discussion of the operation of the ventilating construction 100B of this invention is deemed not necessary.

It has been found that the walls 38 and 39 of some of the twin wall glazing material that forms the sheets 33 of this invention have a relatively thick gauge whereby it may be desired to form the integral hinge means of the flap means thereof so that only part of one edge thereof remains uncut so as to be integral and one-piece with its wall to provide a natural hinge means therewith.

Figure 26:
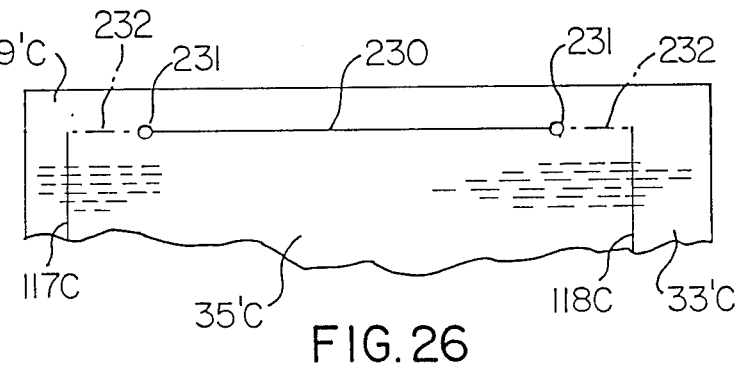
FIG. 26 is a fragmentary view of one face of a ventilating construction of this invention and illustrates another embodiment thereof.

For example, reference is now made to FIG. 26 wherein another ventilating construction of this invention is generally indicated by the reference numeral 100C and parts thereof similar to the ventilating construction 100 previously described are indicated by like reference numerals followed by the reference letter "C".

As illustrated in FIG. 26, the flap 35'C is cut from the sheet 33'C in substantially the same manner as previously described except that instead of having a complete uncut area or edge 111 as in FIG. 20 the wall 39'C has a slit 230 cut completely therethrough and terminating at circular openings 231 at each end thereof to prevent a propagation of the slit 230 outwardly therefrom whereby uncut sections 232 of the wall 39'C extend from the respective openings 231 to the side slits 117C and 118C so as to provide integral parts of the sidewall 39'C that hinge the flap 35'C thereto. Of course, it is to be understood that one or three or more parts 232 could be provided rather than just the two parts 232 as illustrated, as desired.

Therefore, it can be seen that the section or flap 35'C of the sheet 33'C of FIG. 26 comprises a section of the sheet 33'C cut therefrom to define an opening and having at least part of one edge 232 thereof being uncut so as to be integral and one-piece with one of the walls 39'C to provide a natural hinge therewith.

It is also believed that with the thicker gauge twin wall glazing material that forms the sheet 33 of this invention, a longer hinge section of the uncut wall 39 thereof can be provided to form a gentle bending integral hinge by merely slitting the wall 38 on each side of a rib 40 thereof.

Figure 27:
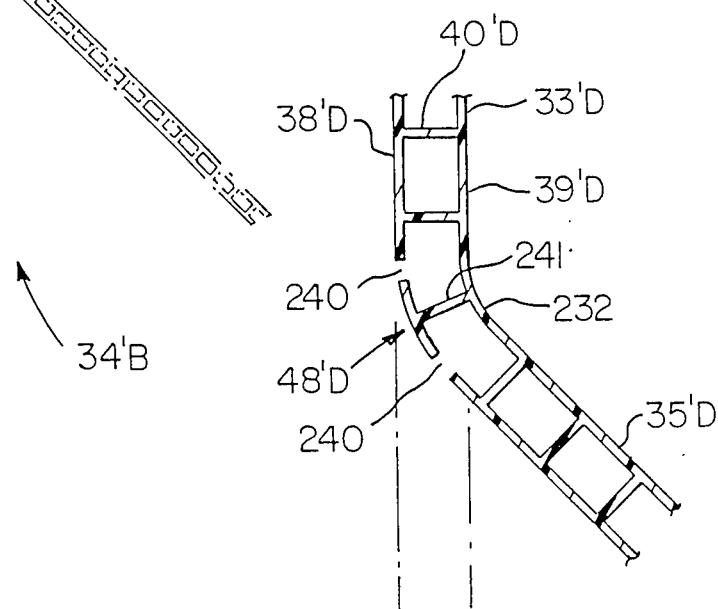
FIG. 27 is a view similar to FIG. 19 and illustrates another embodiment of the hinge structure of this invention.

For example, another embodiment of a ventilating construction of this invention is generally indicated by the reference numeral 100D in FIG. 27 and parts thereof similar to the ventilating construction 100 previously described are indicated by like reference numerals followed by the reference letter "D".

As illustrated in FIG. 27, the sheet 33'D has the two walls 38'D and 39'D interconnected together by the integral spaced apart ribs 40'D as previously described. The flap 35'D is formed in the sheet 33'D by having the cut 48'D in the wall 38'D actually formed by two spaced apart parallel cuts 240 formed through the wall 38'D on opposite sides of one rib 241 as illustrated in FIG. 27 so that the uncut part 232D of the wall 39'D adjacent the slits 240 forms a gentle and longer integral hinge area 232D than if only one slit 240 was provided in the wall 38'D as previously set forth.

Therefore, it can be seen that the operation of the ventilating construction 100D is the same as the other ventilating constructions of this invention as previously set forth so that a further discussion of the operation of the ventilating construction 100D need not be set forth.

While the ventilating constructions of this invention have each been illustrated and described as having a thermally operated actuator operatively interconnected to the flap means thereof to control the positioning of the flap means relative to its opening means in response to the temperature sensed by its actuator means, it is to be understood that the ventilating construction of this invention can be used without a thermally operated actuator means as the flap means thereof may be operated manually or by other actuator means as desired.

Also, while the ventilating constructions of this invention have each been illustrated and described as having the hinge of the flap thereof defined between adjacent ribs so as to be parallel with the ribs of the sheet means, it is to be understood that the integral hinge of this invention could be formed transverse to the ribs of the sheet means, if desired.

Figure 31:
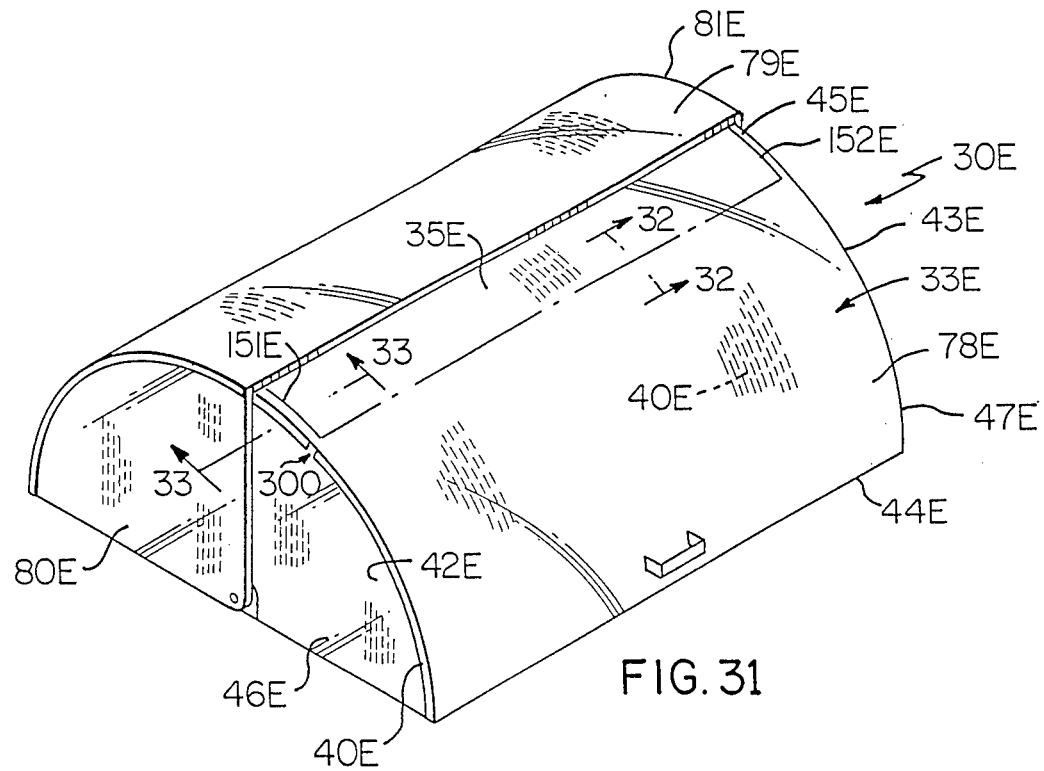
FIG. 31 is a view similar to FIG. 1 and illustrates another ventilating cold frame construction of this invention.
Figure 32:
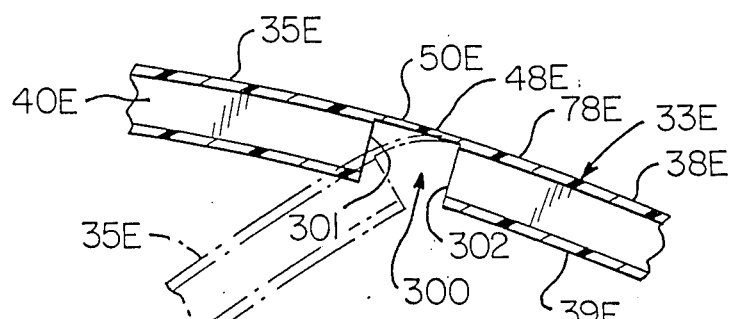
FIG. 32 is an enlarged, fragmentary cross-sectional view taken on line 32—32 of FIG. 31.
Figure 33:
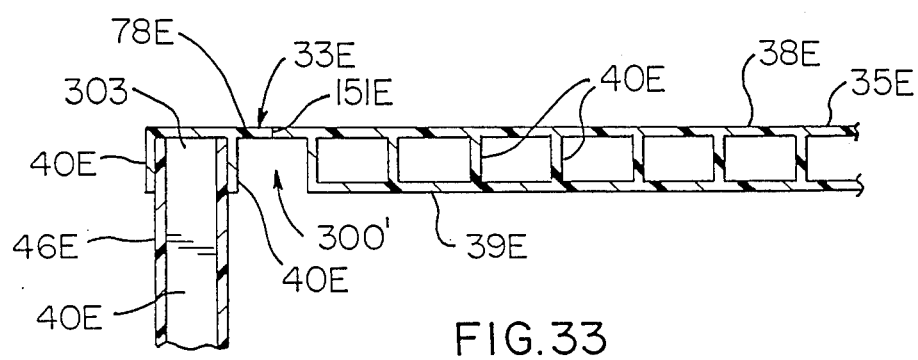
FIG. 33 is an enlarged, fragmentary cross-sectional view taken on line 33—33 of FIG. 31.

In fact a presently preferred ventilating cold frame construction of this invention having such a hinge means is generally indicated by the reference numeral 30E in FIGS. 31-33 and the parts thereof that are similar to the ventilating constructions 30 and 30A previously described are indicated by like reference numerals followed by the reference letter "E".

As illustrated in FIGS. 31-33, the ventilating cold frame construction 30E has the sheet means 33E that form the units 78E and 79E thereof disposed so that the ribs 40E thereof extend between the opposed ends 44E and 45E thereof rather than between the opposed side ends 42E and 43E thereof so as to provide vertical support to the units 78E and 79E as well as provide an easier and stronger connection to the respective side walls 46E, 47E and 80, 81 as will be apparent hereinafter.

The sheet 33E for the unit 78E, either before being heat formed into the curved or arcuate configuration thereof or before and while in a flat condition thereof, can have the flap means 35E formed by cutting and removing the wall 39E and ribs 40E along a path 300, such as by routing the sheet 33E from one side end 42E to the other side end 43E, so that the remaining section 50E of the wall 38E between the resulting sides 301 and 302 of the path 300 defines the hinge means 48E that operates in the manner indicated by phantom lines in FIG. 32. If desired, part of the section 50E of wall 38E can be removed to reduce the thickness thereof during the aforementioned routing operation so as to make the hinge 48E more flexible. For example, when the sheet 33E has the walls 38E and 39E thereof each being approximately 0.020 of an inch thick, the width of the path 300 between the sides 301 and 302 can be approximately ⅜ of an inch and the section 50E of the wall 38E can be reduced to be approximately 0.010 of an inch thick. The portion 300' of the wall 39E between the second and third ribs 40E from each side end 42E and 43E is removed from the path 300 to the end 45E and the wall 38E is slit by slits 151E and 152E medially between the second and third ribs 40E from each side end 42E and 43E whereby the path 300 and the portions 300' in the wall 39E are similar to the cut lines 49 and 153 and the slits 151E and 152E are similar to the slits 151 and 152.

Figure 13:
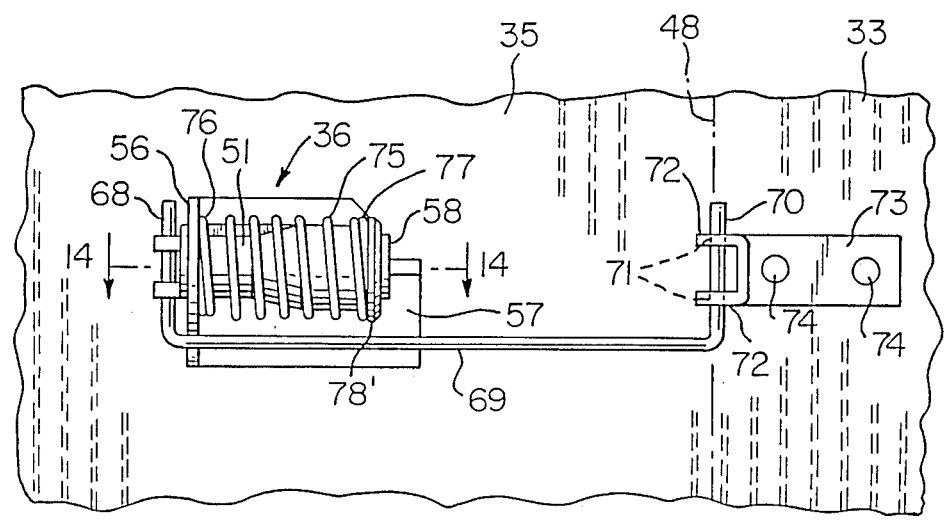
FIG. 13 is a reduced fragmentary view taken in the direction of the arrows 13—13 of FIG. 12.

In this manner, the flap means 35E is formed from the sheet 33E to be operated by a thermally operated device either in the manner provided by the arrangement 36 of FIGS. 12 and 13 or by the arrangement 36A of FIGS.

21-23, as desired. Of course, the flap means 35A could be manually operated, if desired. In any event, the flap means 35E performs the same function as the flap means 35 and 35A previously described for opening and closing the resulting opening means 34E so a further discussion of the operation or purpose thereof is deemed unnecessary.

In order to secure the side walls 46E and 47E to the sheet 33E with the flap means 35E for the unit 78E and the side walls 80E and 81E to the other sheet 33E for the unit 79E, the edge or end 303 of the particular side wall, such as the side wall 46E illustrated in FIG. 33, can be inserted between the end rib 40E and the second rib 40E from the respective side end 42E throughout the entire length of the end 303 and be secured to such ribs 40E by any suitable adhesive means or the like to form a strong structural arrangement.

Therefore, it can be seen that the cold frame 30E will function in the same manner as the cold frames 30 and 30A previously described even though the hinge means 48E of the flap means 35E thereof is formed transverse to the ribs 40E of the sheet 33E. Also, it is to be understood that the flap means of the other ventilating constructions of this invention could likewise have the hinge means thereof disposed transverse to the ribs of the sheet in the same manner as set forth above, if desired.

Therefore, it can be seen that this invention not only provides a new ventilating construction and method of making the same, but also this invention provides a new ventilating cold frame construction and method of making the same.

While the forms and methods of this invention now preferred have been illustrated and described as required by the Patent Statute, it is to be understood that other forms and method steps can be utilized and still fall within the scope of the appended claims wherein each claim sets forth what is believed to be known in each claim prior to this invention in the portion of each claim that is disposed before the terms "the improvement" and sets forth what is believed to be new in each claim according to this invention in the portion of each claim that is disposed after the terms "the improvement" whereby it is believed that each claim sets forth a novel, useful and unobvious invention within the purview of the Patent Statute.

What is claimed is:

1. In a ventilating construction comprising a sheet of material having an opening means therethrough and a flap means hinged to said sheet for opening and closing said opening means, the improvement wherein said sheet comprises two like walls of polymeric material disposed in spaced apart substantially parallel relation with a plurality of spaced apart substantially parallel ribs of polymeric material disposed between said walls and interconnected thereto and wherein said flap means comprises a section of said sheet cut therefrom to define said opening means and having at least part of one edge thereof being uncut so as to be integral and one-piece with one of said walls to provide a natural hinge therewith.

2. A ventilating construction as set forth in claim 1 wherein said flap means and said opening means are substantially rectangular in configuration.

3. A ventilating construction as set forth in claim 2 wherein said sheet has a free end and said flap means has a free end remote from said one edge thereof and comprising part of said free end of said sheet whereby said opening means has only three sides thereof defined by said sheet.

4. A ventilating construction as set forth in claim 3 wherein said flap means is defined by a three-sided cut through the other of said walls of said sheet and by two spaced apart substantially parallel cuts through said one wall of said sheet.

5. A ventilating construction as set forth in claim 4 wherein said free end of said sheet is substantially parallel with said ribs and wherein said two spaced apart cuts join with said three-sided cut so that certain of said ribs of said sheet are cut therefrom to provide ribs for said flap means.

6. A ventilating construction as set forth in claim 5 wherein each rib of said flap means has the opposed ends thereof cut so that the respective rib of said flap means has a substantially trapezoidal configuration and thereby tends to prevent said flap means from passing through said opening means in one direction of movement of said flap means.

7. A ventilating construction as set forth in claim 6 wherein said construction comprises a cold frame and said sheet comprises part of said cold frame.

8. A ventilating construction as set forth in claim 2 wherein said opening means is completely surrounded by said sheet whereby said opening means has all four sides thereof defined by said sheet.

9. A ventilating construction as set forth in claim 8 wherein said flap means is defined by a substantially rectangular cut through the other of said walls of said sheet and by a three-sided cut through said one wall of said sheet.

10. A ventilating construction as set forth in claim 9 wherein the free end of said flap means is substantially parallel with said ribs and wherein said three-sided cut joins with said rectangular cut so that certain of said ribs of said sheet are cut therefrom to provide ribs for said flap means.

11. A ventilating construction as set forth in claim 10 wherein each rib of said flap means has the opposed ends thereof cut so that the respective rib of said flap means has a substantially trapezoidal configuration and thereby tends to prevent said flap means from passing through said opening means in one direction of movement of said flap means.

12. A ventilating construction as set forth in claim 11 wherein said construction is adapted to be secured to a building wall to cover an opening therethrough and provide ventilation means for an interior section of said building that is defined in part by said building wall.

13. A ventilating construction as set forth in claim 4 wherein said free end of said sheet is substantially transverse with said ribs and wherein said three-sided cut comprises an intermediate cut and two outboard cuts disposed substantially transverse to said intermediate cut and respectively at the opposed ends thereof, said intermediate cut cutting through said ribs from said other wall to said one wall throughout substantially the same length and width as the length and width of said intermediate cut through said other wall so that certain of said ribs of said sheet are cut therefrom to provide ribs for said flap means.

14. A ventilating construction as set forth in claim 13 wherein said intermediate cut also removes a part of said one wall so as to reduce the thickness thereof substantially throughout the same length and width as said length and width of said intermediate cut through said other wall.

15. A ventilating construction as set forth in claim 13 wherein said two outboard cuts through said other wall each has a width substantially equal to the width between adjacent ribs of said sheet throughout the length of the respective outboard cut.

16. In a ventilating cold frame construction comprising a sheet of material forming an outer wall means of said cold frame construction having an opening means therethrough and a flap means hinged to said sheet for opening and closing said opening means, the improvement wherein said sheet comprises two like walls of polymeric material disposed in spaced apart substantially parallel relation with a plurality of spaced apart substantially parallel ribs of polymeric material disposed between said walls and interconnected thereto and wherein said flap means comprises a section of said sheet cut therefrom to define said opening means and having at least part of one edge thereof being uncut so as to be integral and one-piece with one of said walls to provide a natural hinge therewith.

17. A ventilating cold frame construction as set forth in claim 16 wherein said cold frame construction comprises two like pivotally mounted units each having a pair of spaced apart side walls and an outer wall means interconnected to its respective pair of side walls, said sheet comprising said outer wall means of one of said units.

18. A ventilating cold frame construction as set forth in claim 17 wherein each unit has said outer wall means being arcuate and defining substantially a quarter of a circle.

19. A ventilating cold frame construction as set forth in claim 18 wherein each side wall is formed of the same material as said sheet of material.

20. A ventilating cold frame construction as set forth in claim 19 wherein the outer wall means of the other unit is formed of the same material as said sheet of material.

21. A ventilating cold frame construction as set forth in claim 20 wherein said one unit is adapted to pivot to a position so as to be nested inside of said other unit.

22. A ventilating cold frame construction as set forth in claim 21 wherein said side walls are foldable for storage and shipping purposes.

23. In a method of making a ventilating construction comprising the step of forming a sheet of material to have an opening means therethrough and a flap means hinged to said sheet for opening and closing said opening means, the improvement comprising the steps of forming said sheet to comprise two like walls of polymeric material disposed in spaced apart substantially parallel relation with a plurality of spaced apart substantially parallel ribs of polymeric material disposed between said walls and interconnected thereto, and forming said flap means to comprise a section of said sheet cut therefrom to define said opening means and have at least part of one edge thereof being uncut so as to be integral and one-piece with one of said walls to provide a natural hinge therewith.

* * * * *